US011942030B1

(12) United States Patent
Seo et al.

(10) Patent No.: US 11,942,030 B1
(45) Date of Patent: Mar. 26, 2024

(54) SOURCE DRIVER, DISPLAY DEVICE OR ELECTRONIC DEVICE INCLUDING SOURCE DRIVER, AND METHOD OF DRIVING THE SAME

(71) Applicant: SAMSUNG DISPLAY CO., LTD., Yongin-si (KR)

(72) Inventors: Hae Kwan Seo, Yongin-si (KR); Bon Seog Gu, Yongin-si (KR); Jin Young Roh, Yongin-si (KR); Jae Keun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/303,396

(22) Filed: Apr. 19, 2023

(30) Foreign Application Priority Data

Sep. 28, 2022 (KR) ........................ 10-2022-0123806

(51) Int. Cl.
*G09G 3/32* (2016.01)
*G09G 3/20* (2006.01)

(52) U.S. Cl.
CPC ............. *G09G 3/32* (2013.01); *G09G 3/2096* (2013.01); *G09G 2300/0426* (2013.01);
(Continued)

(58) Field of Classification Search
CPC ................... G09G 3/32; G09G 3/2096; G09G 2300/0426; G09G 2300/0842;
(Continued)

(56) References Cited

U.S. PATENT DOCUMENTS 9,218,758 B2 12/2015 Fujii
10,410,578 B2 9/2019 Song et al.
(Continued)

FOREIGN PATENT DOCUMENTS

KR 10-2019-0062679 6/2019
KR 10-2048942 11/2019
(Continued)

OTHER PUBLICATIONS

Office Action dated Sep. 7, 2023 issued for the cross-referenced U.S. Appl. No. 18/145,606, filed Dec. 22, 2022.

*Primary Examiner* — Richard J Hong
(74) *Attorney, Agent, or Firm* — F. Chau & Associates, LLC

(57) ABSTRACT

A source driver includes a digital-to-analog converter that converts signals corresponding to first and second colors included in digital image data into first and second analog color data voltages, respectively, an output buffer unit including a first output buffer that alternately outputs the first color data voltage and the second color data voltage during one horizontal period, and a controller that controls the digital-to-analog converter and the first output buffer to alternately output the first color data voltage and the second color data voltage corresponding to each horizontal period for each horizontal period. The controller controls the first output buffer such that the second color data voltage is output after the first color data voltage is first output during a first horizontal period, and the first color data voltage is output after the second color data voltage is first output during a subsequent second horizontal period.

29 Claims, 9 Drawing Sheets

(52) U.S. Cl.
CPC ............... *G09G 2300/0842* (2013.01); *G09G 2310/0202* (2013.01); *G09G 2310/027* (2013.01); *G09G 2310/0291* (2013.01); *G09G 2310/0297* (2013.01); *G09G 2310/08* (2013.01)

(58) Field of Classification Search
CPC ..... G09G 2310/0202; G09G 2310/027; G09G 2310/0291; G09G 2310/0297; G09G 2310/08; G09G 3/3291; G09G 3/2003; G09G 3/3677; G09G 3/3283; G09G 3/20; G09G 3/3688
See application file for complete search history.

(56) References Cited

U.S. PATENT DOCUMENTS

| | | | | |
|---|---|---|---|---|
| 10,867,560 | B2 | 12/2020 | Yoon et al. | |
| 11,423,821 | B2 | 8/2022 | Oh et al. | |
| 2014/0333676 | A1 | 11/2014 | Fujii | |
| 2018/0315390 | A1* | 11/2018 | Kong | G09G 3/3688 |
| 2018/0330654 | A1 | 11/2018 | Moon et al. | |
| 2019/0080652 | A1 | 3/2019 | Kim et al. | |
| 2020/0074908 | A1* | 3/2020 | Kang | G09G 3/20 |
| 2020/0286418 | A1* | 9/2020 | Lee | G09G 3/3677 |
| 2021/0233455 | A1 | 7/2021 | Yang et al. | |
| 2021/0366343 | A1* | 11/2021 | Oh | G09G 3/3291 |
| 2022/0148503 | A1 | 5/2022 | Seo et al. | |
| 2022/0310003 | A1* | 9/2022 | Harada | G09G 3/3283 |
| 2023/0122018 | A1 | 4/2023 | Choi | |
| 2023/0178033 | A1* | 6/2023 | Kim | G09G 3/2003<br>345/204 |

FOREIGN PATENT DOCUMENTS

| | | |
|---|---|---|
| KR | 10-2020-0015870 | 2/2020 |
| KR | 10-2020-0081856 | 7/2020 |
| KR | 10-2021-0144402 | 11/2021 |
| KR | 10-2357345 | 2/2022 |
| KR | 10-2022-0064463 | 5/2022 |
| WO | 2022115118 | 6/2022 |

* cited by examiner

PXC1: PX11, PX21, PX31, PX41
PXC2: PX12, PX22, PX32, PX42
PXC3: PX13, PX23, PX33, PX43
PXC4: PX14, PX24, PX34, PX44
PXC5: PX15, PX25, PX35, PX45
PXC6: PX16, PX26, PX36, PX46
PXC7: PX17, PX27, PX37, PX47
PXC8: PX18, PX28, PX38, PX48

SOURCE DRIVER, DISPLAY DEVICE OR ELECTRONIC DEVICE INCLUDING SOURCE DRIVER, AND METHOD OF DRIVING THE SAME

CROSS-REFERENCE TO RELATED APPLICATIONS

This application claims priority under 35 U.S.C. § 119 to Korean Patent Application No. 10-2022-0123806, filed on Sep. 28, 2022, the disclosure of which is incorporated by reference herein in its entirety.

TECHNICAL FIELD

Embodiments of the disclosure relate to a source driver, a display device or an electronic device including the source driver, and a method of driving the same.

DISCUSSION OF RELATED ART

As information technology advances, the use of a display device, such as a liquid crystal display device or an organic light emitting display device, which conveys information to a user, is increasing.

A PENTILE™ pixel structure may have a structure in which sub-pixels that emit red and blue light are alternately connected to the same data line along an extension direction of a data line, and sub-pixels that emit green light, are successively connected to the same data line along the extension direction of the data line.

The data line to which the sub-pixels that emit the green light are connected may supply only a green data voltage for each horizontal period, and the data line to which the sub-pixels that emit the red and blue light are connected may alternately supply a red data voltage and a blue data voltage of different voltage levels for each horizontal period.

SUMMARY

According to an embodiment of the disclosure, a source driver that provides a data voltage to pixels included in a display panel while minimizing or reducing power consumption may be provided.

In addition, according to an embodiment of the disclosure, a display device and a driving method capable of reducing power consumption during driving while including a PENTILE™ pixel structure may be provided.

According to an embodiment of the disclosure, a source driver includes a digital-to-analog converter configured to convert a signal corresponding to a first color and a signal corresponding to a second color included in digital image data received from outside of the source driver into a first color data voltage and a second color data voltage, which are analog voltages, respectively. The source driver further includes an output buffer unit including a first output buffer configured to alternately output the first color data voltage and the second color data voltage during one horizontal period among a plurality of horizontal periods, and a controller configured to control the digital-to-analog converter and the first output buffer to alternately output the first color data voltage and the second color data voltage corresponding to each horizontal period for each horizontal period. The controller controls the first output buffer such that the second color data voltage is output after the first color data voltage is first output during a first horizontal period among the plurality of horizontal periods, and the first color data voltage is output after the second color data voltage is first output during a second horizontal period among the plurality of horizontal periods, in which the second horizontal period is subsequent to the first horizontal period.

In an embodiment, the digital-analog converter converts a signal corresponding to a third color included in the digital image data into a third color data voltage which is an analog voltage, the output buffer unit further includes a second output buffer configured to alternately output the third color data voltage and the second color data voltage during the one horizontal period, and the controller controls the digital-to-analog converter and the second output buffer to output the third color data voltage and the second color data voltage corresponding to each horizontal period for each horizontal period.

In an embodiment, the controller controls the second output buffer such that the second color data voltage is output after the third color data voltage is first output from the second output buffer during the first horizontal period, and the third color data voltage is output after the second color data voltage is output during the second horizontal period.

In an embodiment, the source driver further includes a demultiplexer configured to selectively transfer the first color data voltage and the second color data voltage output from the first output buffer through a first data line to a first sub-data line and a second sub-data line for each horizontal period, and selectively transfer the third color data voltage and the second color data voltage output from the second output buffer through a second data line to a third sub-data line and a fourth sub-data line for each horizontal period.

In an embodiment, each of the first horizontal period and the second horizontal period includes a first sub-period and a second sub-period which is subsequent to the first sub-period. The controller controls the demultiplexer to transfer the first color data voltage from the first output buffer to the first sub-data line during the first sub-period of the first horizontal period, transfer the second color data voltage from the first output buffer to the second sub-data line during the second sub-period of the first horizontal period, transfer the second color data voltage from the first output buffer to the second sub-data line during the first sub-period of the second horizontal period, and transfer the first color data voltage from the first output buffer to the first sub-data line during the second sub-period of the second horizontal period.

In an embodiment, the controller controls the demultiplexer to transfer the third color data voltage from the second output buffer to the third sub-data line during the first sub-period of the first horizontal period, transfer the second color data voltage from the second output buffer to the fourth sub-data line during the second sub-period of the first horizontal period, transfer the second color data voltage from the second output buffer to the fourth sub-data line during the first sub-period of the second horizontal period, and transfer the third color data voltage from the second output buffer to the third sub-data line during the second sub-period of the second horizontal period.

In an embodiment, the demultiplexer includes a first select transistor connected between the first data line and the first sub-data line, a second select transistor connected between the first data line and the second sub-data line, a third select transistor connected between the second data line and the third sub-data line, and a fourth select transistor connected between the second sub-data line and the fourth sub-data line. The controller controls the first select transistor and the third select transistor to be turned on during the first sub-period of the first horizontal period, controls the second select transistor and the fourth select transistor to be turned on during the second sub-period of the first horizontal period and the first sub-period of the second horizontal period, and controls the first select transistor and the third select transistor to be turned on during the second sub-period of the second horizontal period.

According to an embodiment of the disclosure, a display device includes a pixel unit including a plurality of pixel columns each including a plurality of sub-pixels, a source driver configured to alternately output a first color data voltage and a second color data voltage through a first data line during one horizontal period including a first sub-period and a second sub-period, which is subsequent to the first sub-period, a demultiplexer configured to selectively transfer the first color data voltage and the second color data voltage output through the first data line to a first sub-data line corresponding to a first pixel column among the plurality of pixel columns and a second sub-data line corresponding to a second pixel column among the plurality of pixel columns for each horizontal period, and a timing controller. The timing controller is configured to control the demultiplexer to connect the first data line and the first sub-data line during a first sub-period of a first horizontal period, connect the first data line and the second sub-data line during a second sub-period of the first horizontal period and a first sub-period of a second horizontal period, and connect the first data line and the first sub-data line during a second sub-period of the second horizontal period. A state in which the first data line and the second sub-data line are connected to each other is maintained during the second sub-period of the first horizontal period and the first sub-period of the second horizontal period.

In an embodiment, the source driver alternately outputs a third color data voltage and the second color data voltage through a second data line during the one horizontal period. In addition, the demultiplexer selectively transfers the third color data voltage and the second color data voltage output through the second data line to a third sub-data line corresponding to a third pixel column among the plurality of pixel columns and a fourth sub-data line corresponding to a fourth pixel column among the plurality of pixel columns for each horizontal period. In addition, the timing controller controls the source driver and the demultiplexer to connect the second data line and the third sub-data line during the first sub-period of the first horizontal period, connect the second data line and the fourth sub-data line during the second sub-period of the first horizontal period and the first sub-period of the second horizontal period, and connect the second data line and the third sub-data line during the second sub-period of the second horizontal period. A state in which the second data line and the fourth sub-data line are connected to each other is maintained during the second sub-period of the first horizontal period and the first sub-period of the second horizontal period.

In an embodiment, the source driver outputs the first color data voltage to the first data line in the first sub-period of the first horizontal period, successively output the second color data voltage to the first data line in each of the second sub-period of the first horizontal period and the first sub-period of the second horizontal period, outputs the first color data voltage in the second sub-period of the second horizontal period, outputs the third color data voltage to the second data line in the first sub-period of the first horizontal period, successively outputs the second color data voltage to the second data line in each of the second sub-period of the first horizontal period and the first sub-period of the second horizontal period, and outputs the third color data voltage in the second sub-period of the second horizontal period.

In an embodiment, the demultiplexer is included in the source driver.

In an embodiment, the source driver includes an output buffer unit including a first output buffer that alternately outputs the first color data voltage and the second color data voltage, and a second output buffer that alternately outputs the third color data voltage and the second color data voltage. The timing controller controls the demultiplexer to transfer the first color data voltage from the first output buffer to the first sub-data line during the first sub-period of the first horizontal period, transfer the second color data voltage from the first output buffer to the second sub-data line during the second sub-period of the first horizontal period, transfer the second color data voltage from the first output buffer to the second sub-data line during the first sub-period of the second horizontal period, and transfer the first color data voltage from the first output buffer to the first sub-data line during the second sub-period of the second horizontal period.

In an embodiment, the timing controller controls the demultiplexer to transfer the third color data voltage from the second output buffer to the third sub-data line during the first sub-period of the first horizontal period, transfer the second color data voltage from the second output buffer to the fourth sub-data line during the second sub-period of the first horizontal period, transfer the second color data voltage from the second output buffer to the fourth sub-data line during the first sub-period of the second horizontal period, and transfer the third color data voltage from the second output buffer to the third sub-data line during the second sub-period of the second horizontal period.

In an embodiment, the first pixel column includes a plurality of sub-pixels in which a first color sub-pixel having a first color and a third color sub-pixel having a third color are alternately arranged one by one along a first direction parallel to a direction in which the first sub-data line extends, the second pixel column includes a plurality of sub-pixels in which a second color sub-pixel having a second color is successively arranged along the first direction, the third pixel column includes a plurality of sub-pixels in which the third color sub-pixel and the first color sub-pixel are alternately arranged one by one along the first direction, and the fourth pixel column includes a plurality of sub-pixels in which the second color sub-pixel is successively arranged along the first direction.

In an embodiment, each of the plurality of sub-pixels includes a light emitting element that emits light in any one of the first color, the second color, and the third color, and a driving transistor connected between power and an anode electrode of the light emitting element and that controls a current amount flowing from the power to the light emitting element based on a magnitude of a data voltage provided from the source driver through a data line.

In an embodiment, the pixel unit further includes a fifth pixel column including a plurality of sub-pixels in which the first color sub-pixel and the third color sub-pixel are alternately arranged one by one along the first direction, an anode electrode of a light emitting element included in each of the third color sub-pixels arranged in the first pixel column is connected to a driving transistor included in each of the third color sub-pixels included in the third pixel column, and an anode electrode of a light emitting element included in each of the first color sub-pixels arranged in the third pixel column is connected to a driving transistor included in each of the first color sub-pixels included in the fifth pixel column.

In an embodiment, in the first horizontal period, emission of a light emitting element of the first color sub-pixel included in the first pixel column is controlled according to the first color data voltage provided to the first sub-data line through the first data line during the first sub-period of the first horizontal period, and in the second horizontal period, emission of the light emitting element included in the third color sub-pixel included in the first pixel column is controlled according to the third color data voltage provided to the third sub-data line through the second data line during the second sub-period of the second horizontal period.

In an embodiment, the source driver alternately outputs the first color data voltage and the second color data voltage through a third data line during one horizontal period, the first color data voltage output through the third data line is transferred to a fifth sub-data line corresponding to the fifth pixel column, in the first horizontal period, emission of the light emitting element of the third color sub-pixel included in the third pixel column is controlled according to the third color data voltage provided to the third sub-data line through the second data line during the first sub-period of the first horizontal period, and in the second horizontal period, emission of the light emitting element of the first color sub-pixel included in the third pixel column is controlled according to the first color data voltage provided to the fifth sub-data line through the third data line during the second sub-period of the second horizontal period.

In an embodiment, during the first horizontal period and the second horizontal period, only the first color data voltage is provided to the first sub-data line, only the second color data voltage is provided to the second sub-data line, only the third color data voltage is provided to the third sub-data line, only the second color data voltage is provided to the fourth sub-data line, and only the first color data voltage is provided to a fifth sub-data line connected to the fifth pixel column.

In an embodiment, the demultiplexer includes a first select transistor connected between the first data line and the first sub-data line, a second select transistor connected between the first data line and the second sub-data line, a third select transistor connected between the second data line and the third sub-data line, and a fourth select transistor connected between the second data line and the fourth sub-data line. The controller controls the first select transistor and the third select transistor to be turned on during the first sub-period of the first horizontal period, controls the second select transistor and the fourth select transistor to be turned on during the second sub-period of the first horizontal period and the first sub-period of the second horizontal period, and controls the first select transistor and the third select transistor to be turned on during the second sub-period of the second horizontal period.

According to an embodiment of the disclosure, a method of driving a display device including a plurality of pixel columns each including a plurality of sub-pixels includes outputting a first color data voltage through a first data line in a first sub-period of a first horizontal period, connecting a first sub-data line corresponding to a first pixel column among the plurality of pixel columns and the first data line during the first sub-period of the first horizontal period, successively outputting a second color data voltage different from the first color through the first data line in each of a second sub-period of the first horizontal period and a first sub-period of a second horizontal period, connecting a second sub-data line corresponding to a second pixel column among the plurality of pixel columns and the first data line during the second sub-period of the first horizontal period and the first sub-period of the second horizontal period, outputting the first color data voltage through the first data line in the second sub-period of the second horizontal period, and connecting the first sub-data line and the first data line during the second sub-period of the second horizontal period. A state in which the first data line and the second sub-data line are connected to each other is maintained during the second sub-period of the first horizontal period and the first sub-period of the second horizontal period.

According to an embodiment, the method further includes outputting a third color data voltage different from the first color and the second color through a second data line in the first sub-period of the first horizontal period, connecting a third sub-data line corresponding to a third pixel column among the plurality of pixel columns and the second data line during the first sub-period of the first horizontal period, successively outputting the second color data voltage through the second data line in each of the second sub-period of the first horizontal period and the first sub-period of the second horizontal period, connecting a fourth sub-data line corresponding to a fourth pixel column among the plurality of pixel columns and the second data line during the second sub-period of the first horizontal period and the first sub-period of the second horizontal period, outputting the third color data voltage through the second data line in the second sub-period of the second horizontal period, and connecting the fourth sub-data line and the second data line during the second sub-period of the second horizontal period. A state in which the second data line and the fourth sub-data line are connected to each other is maintained during the second sub-period of the first horizontal period and the first sub-period of the second horizontal period.

In an embodiment, the display device includes a first output buffer that alternately outputs the first color data voltage and the second color data voltage to the first data line, and a second output buffer that alternately outputs the third color data voltage and the second color data voltage to the second data line.

In an embodiment, the first pixel column includes a plurality of sub-pixels in which a first color sub-pixel and a third color sub-pixel are alternately arranged one by one along a first direction parallel to a direction in which the first sub-data line extends, the second pixel column includes a plurality of sub-pixels in which a second color sub-pixel is sequentially arranged along the first direction, the third pixel column includes a plurality of sub-pixels in which the third color sub-pixel and the first color sub-pixel are alternately arranged one by one along the first direction, and the fourth pixel column includes a plurality of sub-pixels in which the second color sub-pixel is successively arranged along the first direction.

In an embodiment, the plurality of pixel columns further include a fifth pixel column including a plurality of sub-pixels in which the first color sub-pixel and the third color sub-pixel are alternately arranged one by one along the first direction, each of the plurality of sub-pixels includes a light emitting element that emits light in any one of the first color, the second color, and the third color, and a driving transistor that controls a current amount that flows from power to the light emitting element based on a magnitude of a data voltage provided through a data line, an anode electrode of a light emitting element included in each of the third color sub-pixels arranged in the first pixel column is connected to a driving transistor included in each of the third color sub-pixels included in the third pixel column, and an anode electrode of a light emitting element included in each of the first color sub-pixels arranged in the third pixel column is connected to a driving transistor included in each of the first color sub-pixels included in the fifth pixel column.

In an embodiment, in the first horizontal period, emission of a light emitting element of the first color sub-pixel included in the first pixel column is controlled according to the first color data voltage provided to the first sub-data line through the first data line during the first sub-period of the first horizontal period, and in the second horizontal period, emission of the light emitting element included in the third color sub-pixel included in the first pixel column is controlled according to the third color data voltage provided to the third sub-data line through the second data line during the second sub-period of the second horizontal period.

According to an embodiment, the method further includes outputting the first color data voltage through a third data line in the second sub-period of the second horizontal period, and connecting a fifth sub-data line corresponding to the fifth pixel column and the third data line during the second sub-period of the second horizontal period. In the first horizontal period, emission of a light emitting element of the third color sub-pixel included in the third pixel column is controlled according to the third color data voltage provided to the third sub-data line through the second data line during the first sub-period of the first horizontal period, and in the second horizontal period, emission of the light emitting element of the first color sub-pixel included in the third pixel column is controlled according to the first color data voltage provided to the fifth sub-data line through the third data line during the second sub-period of the second horizontal period.

In an embodiment, during the first horizontal period and the second horizontal period, only the first color data voltage is provided to the first sub-data line, only the second color data voltage is provided to the second sub-data line, only the third color data voltage is provided to the third sub-data line, only the second color data voltage is provided to the fourth sub-data line, and only the first color data voltage is provided to a fifth sub-data line connected to the fifth pixel column.

According to an embodiment of the disclosure, an electronic device includes a processor, and a display module configured to display an image corresponding to image data received from the processor under control of the processor. The display module includes a display panel including a plurality of pixel columns each including a plurality of sub-pixels, and a source driver configured to convert a signal corresponding to a first color and a signal corresponding to a second color included in the image data into a first color data voltage and a second color data voltage, respectively, and alternately provide the first color data voltage and the second color data voltage to the plurality of pixel columns included in the display panel during one horizontal period. The processor controls the display module such that the second color data voltage is output to a second sub-data line corresponding to a second pixel column among the plurality of pixel columns after the first color data voltage is first output to a first sub-data line corresponding to a first pixel column among the plurality of pixel columns during a first horizontal period, and the first color data voltage is output to the first sub-data line after the second color data voltage is first output to the second sub-data line during a second horizontal period, which is subsequent to the first horizontal period.

The source driver according to an embodiment of the disclosure may provide a data voltage to pixels included in a display panel while minimizing or reducing power consumption.

A display device according to an embodiment of the disclosure may include a PENTILE™ pixel structure, and reduce power consumption during driving.

BRIEF DESCRIPTION OF THE DRAWINGS

The above and other features of the present disclosure will become more apparent by describing in further detail embodiments thereof with reference to the accompanying drawings, in which.

DETAILED DESCRIPTION OF THE EMBODIMENTS

Figure 1:
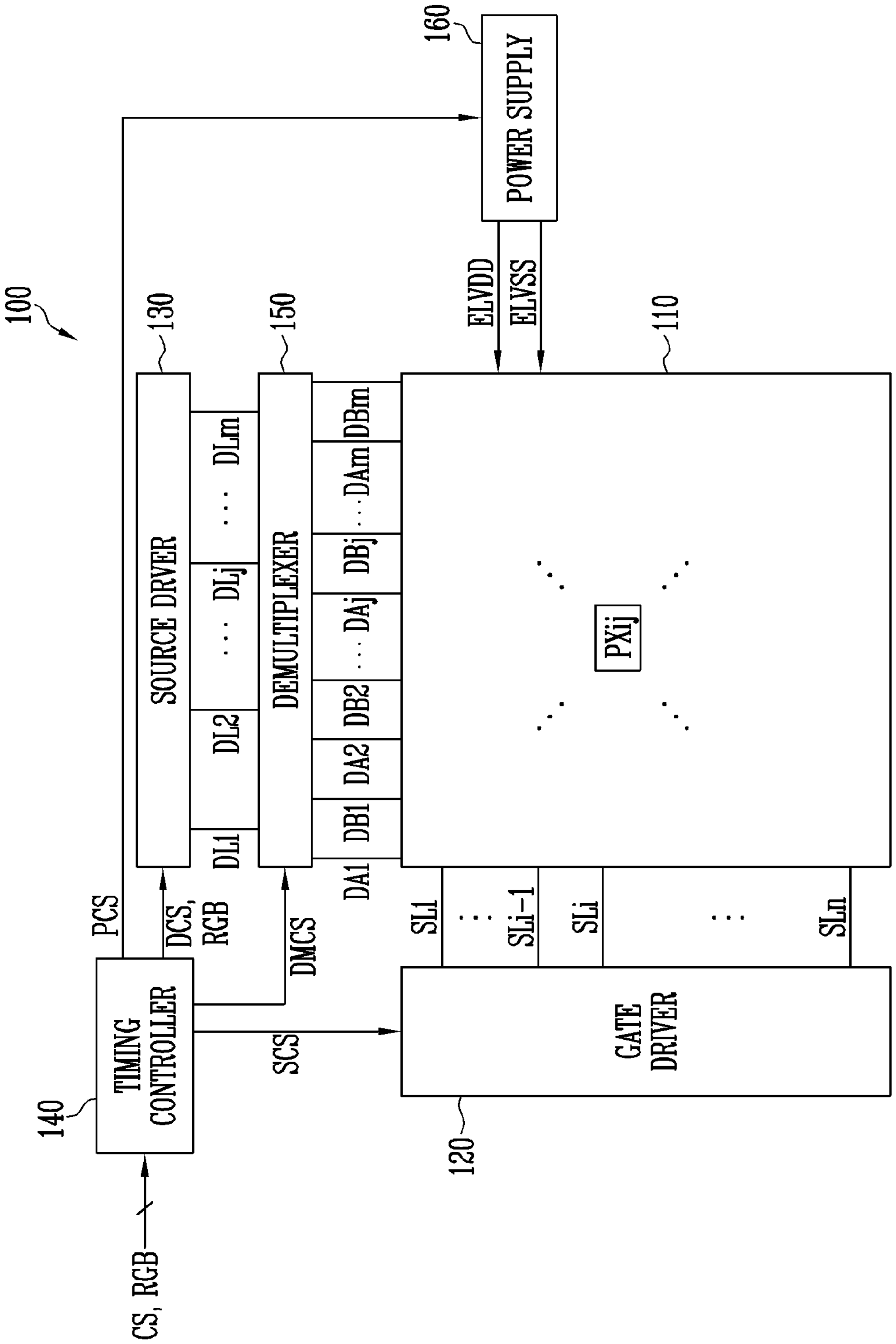
FIG. 1 is a block diagram of a display device according to an embodiment.

Embodiments of the present disclosure will be described more fully hereinafter with reference to the accompanying drawings. The same or similar reference numerals may refer to the same or similar elements throughout the accompanying drawings.

It will be understood that the terms “first,” “second,” “third,” etc. are used herein to distinguish one element from another, and the elements are not limited by these terms. Thus, a “first” element in an embodiment may be described as a “second” element in another embodiment.

It should be understood that descriptions of features or aspects within each embodiment should typically be considered as available for other similar features or aspects in other embodiments, unless the context clearly indicates otherwise.

As used herein, the singular forms “a”, “an” and “the” are intended to include the plural forms as well, unless the context clearly indicates otherwise.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Other uses of these terms and similar terms to describe the relationships between components should be interpreted in a like fashion.

FIG. 1 is a block diagram of a display device according to an embodiment.

Referring to FIG. 1, the display device 100 according to an embodiment may include a pixel unit 110, a gate driver 120, a source driver 130, a timing controller 140, a demultiplexer 150, and a power supply 160.

The display device 100 may be, for example, a flat display device, a flexible display device, a curved display device, a foldable display device, or a bendable display device. In addition, the display device may be applied to, for example, a transparent display device, a head-mounted display device, a wearable display device, and the like. In addition, the display device 100 may be applied to various electronic devices such as, for example, a smartphone, a tablet, a smart pad, a TV, and a monitor.

According to embodiments, the display device 100 may be implemented as, for example, an organic light emitting display device, a liquid crystal display device, or the like. However, this is an example, and a configuration of the display device 100 is not limited thereto. For example, according to embodiments, the display device 100 may be a self-emission display device including an inorganic light emitting element.

The pixel unit 110 includes pixels PXij positioned to be connected to data lines DL1 to DLm and scan lines SL1 to SLn, where each of i, j, m and n is a positive integer. The pixels PXij may receive voltages of first power ELVDD and second power ELVSS from outside of the pixel unit 110. The pixel unit 110 may also be referred to herein as a display panel, which may display an image via the pixels PXij.

In an embodiment, the plurality of pixels PXij may be configured of a plurality of pixel rows respectively corresponding to the plurality of scan lines SL1 to SLn. Each of the plurality of pixel rows may include a plurality of pixels PXij. Although n scan lines SL1 to SLn are shown in FIG. 1, embodiments of the disclosure are not limited thereto. For example, one or more control lines, scan lines, emission control lines, sensing lines, and the like may be additionally formed in the pixel unit 110 to correspond to a circuit structure of the pixel PXij according to embodiments.

In an embodiment, the plurality of pixels PXij may be configured of a plurality of pixel columns respectively corresponding to a plurality of sub-data lines DA1 to DAm and DB1 to DBm. Each of the plurality of pixel columns may include a plurality of pixels PXij. In an embodiment, the plurality of pixels PXij may be configured of a plurality of pixel columns respectively corresponding to the data lines DL1 to DLm.

In an embodiment, the plurality of pixels PXij included in the pixel unit 110 may have a PENTILE™ pixel structure. Each of the plurality of pixels PXij may be a sub-pixel. In the PENTILE™ pixel structure, sub-pixels emitting light in red (R) and blue (B) may be alternately disposed along an extension direction of the sub-data lines DA1 to DAm. In addition, the sub-pixels emitting green (G) may be successively disposed along the extension direction of the sub-data lines DB1 to DBm.

In an embodiment, transistors included in the pixel PXij may be P-type oxide thin film transistors. For example, the oxide thin film transistor may be a low temperature polycrystalline oxide (LTPO) thin film transistor. However, this is an example, and the P-type transistors are not limited thereto. For example, an active pattern (semiconductor layer) included in the transistors may include an inorganic semiconductor (for example, amorphous silicon, or polysilicon), an organic semiconductor, or the like. In addition, at least one of the transistors included in the display device 100 and/or the pixel PXij may be replaced with an N-type transistor.

The gate driver 120 may receive a scan driving control signal SCS from the timing controller 140. The gate driver 120 receiving the scan driving control signal SCS may supply a scan signal to the scan lines SL1 to SLn.

For example, the gate driver 120 may sequentially supply the scan signal to the scan lines SL1 to SLn. When the scan signal is sequentially supplied to the scan lines SL1 to SLn, the pixels PXij may be selected in a horizontal line unit. To this end, the scan signal may be set to a gate-on voltage (for example, a logic low level) so that the transistors included in the pixels PXij may be turned on.

The source driver 130 may receive a data driving control signal DCS and image data RGB from the timing controller 140. The source driver 130 may provide a data voltage for image display to the pixel unit 110 based on the data driving control signal DCS and the image data RGB received from the timing controller 140.

In an embodiment, the source driver 130 may convert the image data RGB received from the timing controller 140 into the data voltage for each horizontal period, and then provide the data voltage to each of the data lines DL1 to DLm through a plurality of output buffers. The image data RGB received from outside of the timing controller 140 may be a digital signal. The data voltage converted from the image data RGB may be an analog voltage.

For example, the source driver 130 may provide the data voltage to a plurality of sub-pixels included in a first pixel row in synchronization with a scan signal provided through a first scan line SL1 during a first horizontal period. For example, the source driver 130 may provide the data voltage to a plurality of sub-pixels included in a second pixel row in synchronization with a scan signal provided through a second scan line SL2 during a second horizontal period. For example, the source driver 130 may provide the data voltage to a plurality of sub-pixels included in an i-th pixel row in synchronization with a scan signal provided through an i-th scan line SLi during an i-th horizontal period.

In an embodiment, the source driver 130 may alternately output data voltages corresponding to two colors through one data line connected to one output buffer during one horizontal period.

For example, the source driver 130 may alternately output a red data voltage and a green data voltage to a first data line DL1 through a first output buffer during the first horizontal period. For example, the source driver 130 may alternately output a blue data voltage and the green data voltage to a second data line DL2 through a second output buffer during the first horizontal period. For example, the source driver 130 may alternately output the red data voltage (or the blue data voltage) and the green data voltage to a j-th data line through a j-th output buffer during the i-th horizontal period.

The timing controller 140 may generate the data driving control signal DCS, the scan driving control signal SCS, a power driving control signal PCS, and a demultiplexer control signal DMCS in response to synchronization signals supplied from outside of the timing controller 140. An external input signal may include, for example, a vertical synchronization signal Vsync, a horizontal synchronization signal Hsync, and the input image data RGB.

The vertical synchronization signal Vsync may include a plurality of pulses, and may indicate that a previous frame period is ended and a current frame period is started based on a time point at which each of the pulses is generated. In the vertical synchronization signal Vsync, an interval between adjacent pulses may correspond to one frame period. The horizontal synchronization signal Hysnc may include a plurality of pulses, and may indicate that a previous horizontal period is ended and a new horizontal period is started based on a time point at which each of the pulses is generated. The input image data RGB corresponding to one frame may be referred to as one input image.

The data driving control signal DCS generated by the timing controller 140 may be supplied to the source driver 130, the scan driving control signal SCS may be supplied to the gate driver 120, the demultiplexer control signal DMCS may be supplied to the demultiplexer 150, and the power driving control signal PCS may be supplied to the power supply 160.

The data driving control signal DCS may include a source start signal and clock signals. The source start signal may control a sampling start time point of data. The clock signals may be used to control a sampling operation.

The scan driving control signal SCS may include, for example, a scan start signal, a control start signal, and clock signals. The scan start signal may control a timing of the scan signal. The control start signal may control a timing of a control signal. The clock signals may be used to shift the scan start signal and/or the control start signal.

Figure 7:
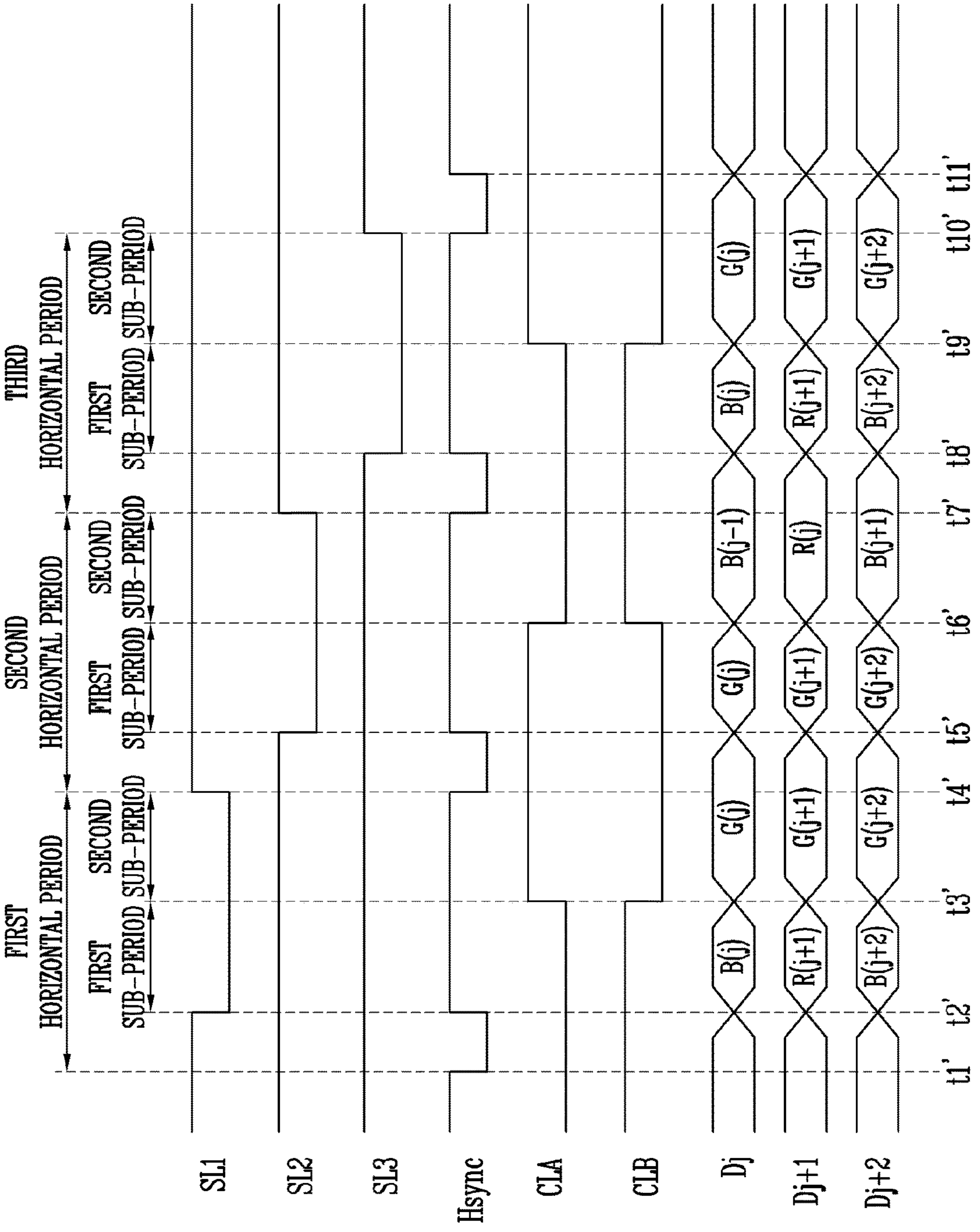
FIG. 7 is a timing diagram illustrating a data voltage and driving control signals provided to each of sub-pixels in a display device according to an embodiment.

The demultiplexer control signal DMCS may include a first select signal CLA (refer to FIG. 7) and a second select signal CLB (refer to FIG. 7). The first select signal may control an on/off operation of a plurality of first select transistors M1, M3, and M5 (refer to FIG. 5) included in the demultiplexer 150, and the second select signal may control an on/off operation of a plurality of second select transistors M2 and M4 (refer to FIG. 5) included in the demultiplexer 150.

The power driving control signal PCS may control supply and voltage levels of the first power ELVDD and the second power ELVSS.

The demultiplexer 150 may be connected between the plurality of data lines DL1 to DLm and the plurality of sub-data lines DA1 to DAm and DB1 to DBm. The demultiplexer 150 may provide the data voltage input from the source driver 130 through the plurality of data lines DL1 to DLm to the plurality of sub-pixels included in the pixel unit 110 through the plurality of sub-data lines DA1 to DAm and DB1 to DBm based on the demultiplexer control signal DMCS in each horizontal period. However, embodiments of the present disclosure are not limited thereto. For example, in an embodiment, the display device 100 does not include the demultiplexer 150, and in this case, the plurality of data lines DL1 to DLm may be directly connected to the pixel unit 110.

For example, during the first horizontal period, the demultiplexer 150 may transfer a red data voltage provided to the first data line DL1 to an A1-th sub-data line DA1, and then transfer a green data voltage provided to the first data line DL1 to a B1-th sub-data line DB1. For example, during the first horizontal period, the demultiplexer 150 may transfer a blue data voltage provided to the second data line DL2 to an A2-th sub-data line DA2, and then transfer a green data voltage provided to the second data line DL2 to a B2-th sub-data line DB2. For example, during the first horizontal period, the demultiplexer 150 may transfers the red (or blue) data voltage provided to the j-th data line DLj to an Aj-th sub-data line DAj, and then transfer the green data voltage provided to the j-th data line DLj to a Bj-th sub-data line DBj.

In an embodiment, the demultiplexer 150 may be included in the source driver 130.

The power supply 160 may supply the voltage of the first power ELVDD and the voltage of the second power ELVSS to the pixel unit 110 based on the power driving control signal PCS. In an embodiment, the first power ELVDD may determine a voltage (for example, a source voltage) of a first electrode of a driving transistor, and the second power ELVSS may determine a cathode voltage of a light emitting element.

Figure 2:
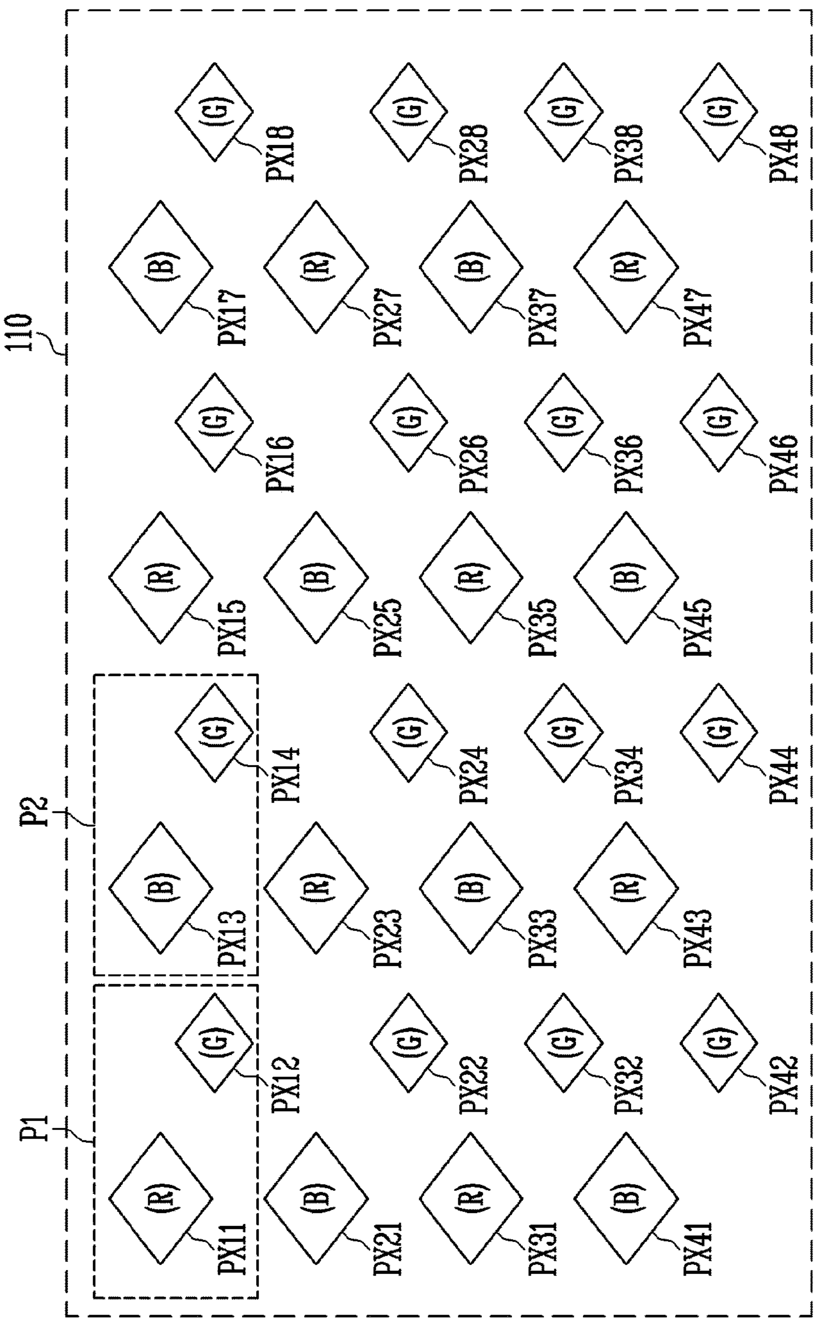
FIG. 2 is a diagram illustrating a PENTILE™ pixel Structure according to an embodiment.

FIG. 2 is a diagram illustrating a PENTILE™ pixel structure according to an embodiment.

Referring to FIGS. 1 and 2, the pixel unit 110 of the PENTILE™ pixel Structure is exemplarily shown. The PENTILE™ pixel structure according to an embodiment may have a structure in which a first pixel P1 having sub-pixels PX11 and PX12 that respectively emit red (R) and green (G) light, and a second pixel P2 having sub-pixels PX13 and PX14 that respectively emit blue (B) and green (G) light, are alternately arranged in a horizontal direction and a vertical direction. In other words, the PENTILE™ pixel structure may have a structure in which sub-pixels that emit red (R) and blue (B) light are alternately arranged along the extension direction of the sub-data lines DA1 to DAm and sub-pixels that emit green (G) light are successively arranged along the extension direction of the sub-data lines DB1 to DBm.

The pixel unit 110 may include a first pixel column PXC1, a second pixel column PXC2, a third pixel column PXC3, a fourth pixel column PXC4, a fifth pixel column PXC5, a sixth pixel column PXC6, a seventh pixel column PXC7, and an eighth pixel column PXC8. Although first to eighth pixel columns PXC1, PXC2, PXC3, PXC4, PXC5, PXC6, PXC7, and PXC8 are shown in FIG. 2, embodiments of the disclosure are not limited thereto. For example, according to embodiments, the pixel unit 110 may include more or less than eight pixel columns.

In the first pixel column PXC1, the sub-pixels that emit red (R) and blue (B) light may be alternately disposed along the extension direction of the sub-data lines DA1 to DAm. The first pixel column PXC1 may include an eleventh sub-pixel PX11, a twenty-first sub-pixel PX21, a thirty-first sub-pixel PX31, and a forty-first sub-pixel PX41.

In the second pixel column PXC2, the sub-pixels that emit green (G) light may be successively disposed along the extension direction of the sub-data lines DB1 to DBm. The second pixel column PXC2 may include a twelfth sub-pixel PX12, a twenty-second sub-pixel PX22, a thirty-second sub-pixel PX32, and a forty-second sub-pixel PX42.

In the third pixel column PXC3, the sub-pixels that emit blue (B) and red (R) light may be alternately disposed along the extending direction of the sub-data lines DA1 to DAm. The third pixel column PXC3 may include a thirteenth sub-pixel PX13, a twenty-third sub-pixel PX23, a thirtythird sub-pixel PX33, and a forty-third sub-pixel PX43. That is, when the blue sub-pixel PX13 (B) is disposed in a first row of the third pixel column PXC3, the red sub-pixel PX11 (R) may be disposed in a first row of the first pixel column PXC1.

In the fourth pixel column PXC4, the sub-pixels that emit green (G) light may be successively disposed along the extension direction of the sub-data lines DB1 to DBm. The fourth pixel column PXC4 may include a fourteenth sub-pixel PX14, a twenty-fourth sub-pixel PX24, a thirty-fourth sub-pixel PX34, and a forty-fourth sub-pixel PX44.

The fifth pixel column PXC5 may include a fifteenth sub-pixel PX15, a twenty-fifth sub-pixel PX25, a thirty-fifth sub-pixel PX35, and a forty-fifth sub-pixel PX45. The seventh pixel column PXC7 may include a seventeenth sub-pixel PX17, a twenty-seventh sub-pixel PX27, a thirty-seventh sub-pixel PX37, and a forty-seventh sub-pixel PX47. In the fifth pixel column PXC5, sub-pixels PX15 and PX35 that emit red (R) light and sub-pixels PX25 and PX45 that emit blue (B) light may be alternately disposed identically to the first pixel column PXC1, and in the seventh pixel column PXC7, sub-pixels PX17 and PX37 that emit blue (B) light and sub-pixels PX27 and PX37 that emit red (R) light may be alternately disposed identically to the third pixel column PXC3.

The sixth pixel column PXC6 may include a sixteenth sub-pixel PX16, a twenty-sixth sub-pixel PX26, a thirty-sixth sub-pixel PX36, and a forty-sixth sub-pixel PX46. The eighth pixel column PXC8 may include an eighteenth sub-pixel PX18, a twenty-eighth sub-pixel PX28, a thirty-eighth sub-pixel PX38, and a forty-eighth sub-pixel PX48. That is, in the sixth pixel column PXC6 and the eighth pixel column PXC8, a plurality of sub-pixels PX16, PX26, PX36, PX46, PX18, PX28, PX38, and PX48 that emit green (G) light may be disposed identically to the second pixel column PXC2 and the fourth pixel column PXC4.

Figure 3:
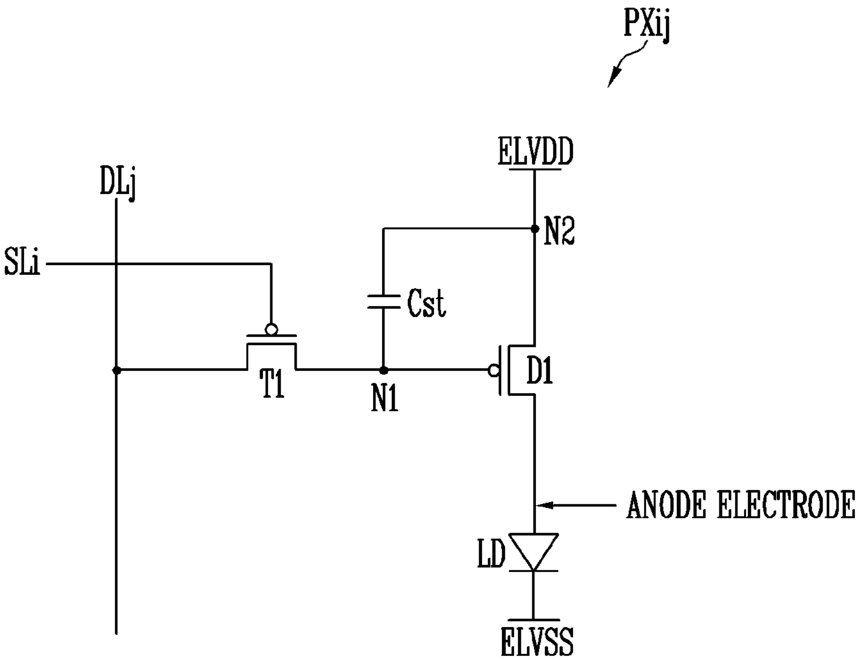
FIG. 3 is a diagram illustrating a pixel circuit according to an embodiment.

FIG. 3 is a diagram illustrating a pixel circuit according to an embodiment.

In FIG. 3, the sub-pixel PXij may be the same as the pixel PXij of FIG. 1 and the sub-pixel of FIG. 2.

Referring to FIG. 3, the sub-pixel PXij may include a pixel circuit including a driving transistor D1, a switching transistor T1, a storage capacitor Cst, and a light emitting element LD.

The driving transistor D1 may be connected between a first power ELVDD terminal and the light emitting element LD, and a gate electrode may be connected to a first node N1. The driving transistor D1 may control a current amount flowing from the first power ELVDD to the second power ELVSS via the light emitting element LD in response to a voltage of the first node N1. In an embodiment, the voltage of the first power ELVDD may be greater than the voltage of the second power ELVSS.

The switching transistor T1 may be connected between the data line DLj and the first node N1, and a gate electrode may be connected to the scan line SLi. The switching transistor T1 may be turned on when the scan signal is supplied to the scan line SLi to electrically connect the data line DLj to the first node N1. Accordingly, the data voltage may be transferred to the first node N1.

The storage capacitor Cst may be connected between the first node N1 corresponding to the gate electrode of the driving transistor D1 and a second node N2 corresponding to the first electrode of the driving transistor D1. The storage capacitor Cst may store a voltage corresponding to a voltage difference between the gate electrode and the first electrode of the driving transistor D1.

A first electrode (anode electrode) of the light emitting element LD may be connected to a second electrode of the driving transistor D1, and a second electrode (cathode electrode) of the light emitting element LD may be connected to the second power ELVSS terminal. The light emitting element LD may generate light of a predetermined luminance in response to the current amount (input current) supplied from the driving transistor D1.

The light emitting element LD may be selected as an organic light emitting diode. In addition, the light emitting element LD may be selected as an inorganic light emitting diode such as, for example, a micro light emitting diode (LED) or a quantum dot LED. In addition, the light emitting element LD may be an element in which an organic material and an inorganic material are combined. FIG. 3 shows that the sub-pixel PXij includes a single light emitting element LD. However, embodiments are not limited thereto. For example, in an embodiment, the sub-pixel PXij may include a plurality of light emitting elements LD, and the plurality of light emitting elements LD may be connected in series, parallel, or series-parallel to each other.

When a scan signal of a turn-on level (here, a logic high level) is provided through the scan line SLi, the switching transistor T1 is turned on. At this time, a voltage corresponding to the data voltage provided to the data line DLj may be stored in the first node N1 (or the storage capacitor Cst).

A driving current corresponding to a difference between a voltage of a first electrode and a voltage of a second electrode of the storage capacitor Cst may flow between the first electrode and the second electrode of the driving transistor D1. Accordingly, the light emitting element LD may emit light with a luminance corresponding to the data voltage.

Figure 4:
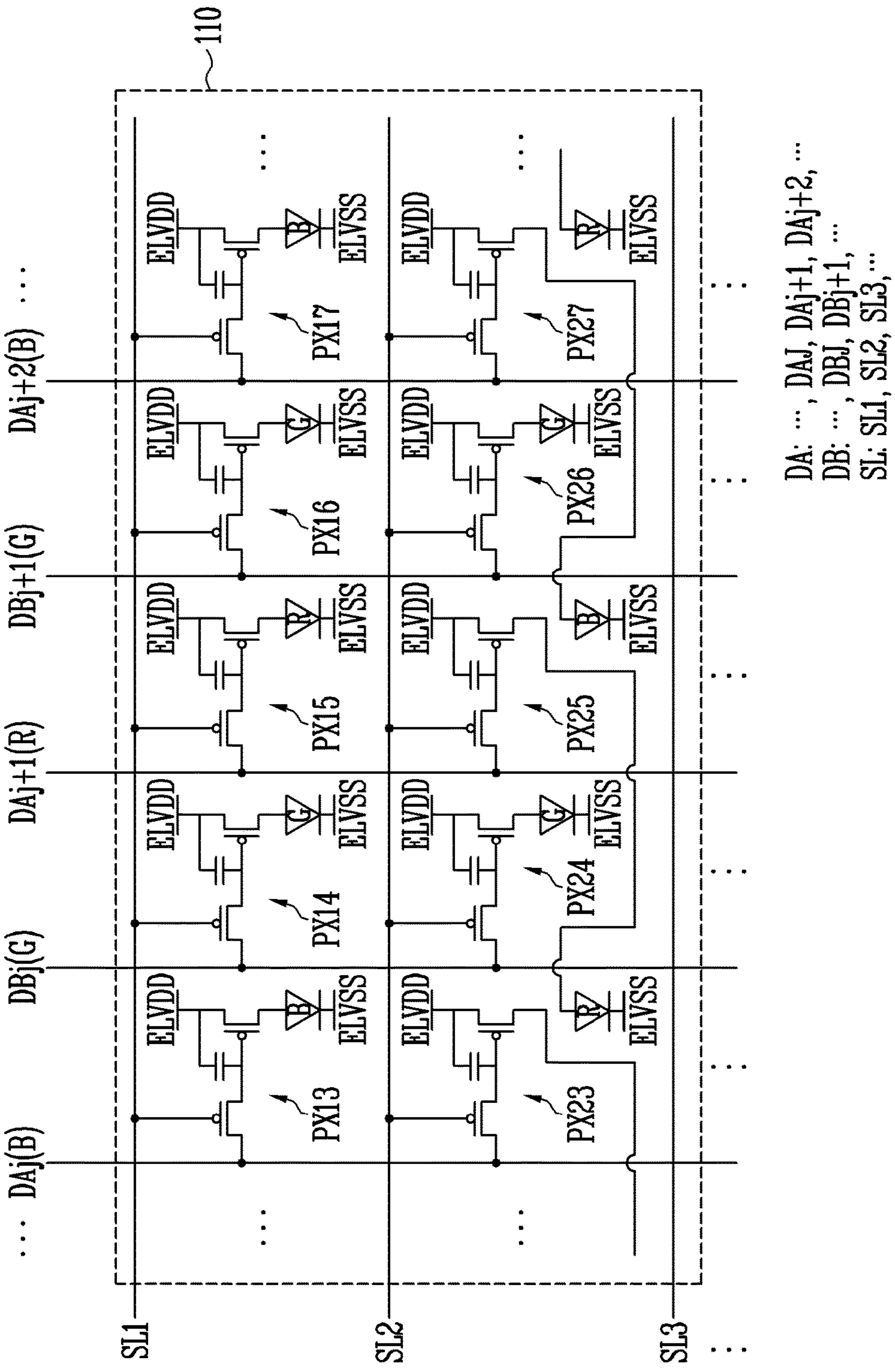
FIG. 4 is a diagram illustrating a data voltage output from a source driver to each of pixels in a display device according to an embodiment.

FIG. 4 is a diagram illustrating a data voltage output from a source driver to each of pixels in a display device according to an embodiment.

Referring to FIG. 4, the plurality of sub-pixels included in the pixel unit 110 may be connected to the sub-data lines DA or DB to configure a plurality of pixel columns. For example, a plurality of sub-pixels connected to the Aj-th sub-data line DAj may configure one pixel column, and a plurality of sub-pixels connected to the Bj-th data line DBj may configure one pixel column. The plurality of sub-pixels included in each pixel column may be arranged along a second direction which is an extension direction of each sub-data line DA or DB. In addition, the plurality of pixel columns may be arranged along a first direction which is a direction in which each scan line SL extends. A plurality of red (R) sub-pixels and a plurality of blue (B) sub-pixels may be alternately connected to A-th sub-data lines DAj, DAj+1, DAj+2, and . . . , and a plurality of green (G) sub-pixels PXij may be successively connected to B-th sub-data lines DBj, DBj+1, and . . . .

The plurality of sub-pixels included in the pixel unit 110 may be connected to scan lines SLs to configure a plurality of pixel rows. For example, a plurality of sub-pixels connected to the first scan line SL1 may configure a first pixel row, and a plurality of sub-pixels connected to the second scan line SL2 may configure a second pixel row. A plurality of sub-pixels connected to the i-th scan line may configure an i-th pixel row. A plurality of sub-pixels connected to each pixel row may be arranged along the first direction, which is the direction in which each scan line SL extends. In addition, the plurality of pixel rows may be arranged in the second direction, which is the direction in which each sub-data line DA or DB extends.

Referring to FIGS. 3 and 4, each of the plurality of sub-pixels shown in FIG. 4 may include the pixel circuit shown in FIG. 3. However, a structure of the pixel circuit included in each sub-pixel is not limited to the pixel circuit disclosed in FIG. 3, and may further include a plurality of transistors or capacitors according to embodiments.

Referring to FIGS. 2 and 4, the plurality of sub-pixels disclosed in FIG. 4 may correspond to any one of the plurality of sub-pixels disclosed in FIG. 2.

For example, in FIG. 4, the sub-pixel connected to the first scan line SL1 and the Aj-th sub-data line DAj may be the same sub-pixel as the thirteenth sub-pixel PX13 of FIG. 2. In FIG. 4, the sub-pixel connected to the first scan line SL1 and the Bj-th sub-data line DBj may be the same sub-pixel as the fourteenth sub-pixel PX14 of FIG. 2. In FIG. 4, the sub-pixel connected to the first scan line SL1 and the (Aj+1)-th sub-data line DAj+1 may be the same sub-pixel as the fifteenth sub-pixel PX15 of FIG. 2. In FIG. 4, the sub-pixel connected to the first scan line SL1 and the (Bj+1)-th sub-data line DBj+1 may be the same sub-pixel as the sixteenth sub-pixel PX16 of FIG. 2. In FIG. 4, the sub-pixel connected to the first scan line SL1 and the (Aj+2)-th sub-data line DAj+2 may be the same sub-pixel as the seventeenth sub-pixel PX17 of FIG. 2.

For example, in FIG. 4, the sub-pixel connected to the second scan line SL2 and the Aj-th sub-data line DAj may be the same sub-pixel as the twenty-third sub-pixel PX23 of FIG. 2. In FIG. 4, the sub-pixel connected to the second scan line SL2 and the Bj-th sub-data line DBj may be the same sub-pixel as the twenty-fourth sub-pixel PX24 of FIG. 2. In FIG. 4, the sub-pixel connected to the second scan line SL2 and the (Aj+1)-th sub-data line DAj+1 may be the same sub-pixel as the twenty-fifth sub-pixel PX25 of FIG. 2. In FIG. 4, the sub-pixel connected to the second scan line SL2 and the (Bj+1)-th sub-data line DBj+1 may be the same sub-pixel as the twenty-sixth sub-pixel PX26 of FIG. 2. In FIG. 4, the sub-pixel connected to the second scan line SL2 and the (Aj+2)-th sub-data line DAj+2 may be the same sub-pixel as the twenty-seventh sub-pixel PX27 of FIG. 2.

Referring to FIGS. 2 and 4, among the plurality of sub-pixels connected to the first scan line SL1, the thirteenth sub-pixel PX13 may include a blue (B) light emitting element, the fourteenth sub-pixel PX14 may include a green (G) light emitting element, the fifteenth sub-pixel PX15 may include a red (R) light emitting element, the sixteenth sub-pixel PX16 may include a green (G) light emitting element, and the seventeenth sub-pixel PX17 may include a blue (B) light emitting element. Among the plurality of sub-pixels connected to the second scan line SL2, the twenty-third sub-pixel PX23 may include a red (R) light emitting element, the twenty-fourth sub-pixel PX24 may include a green (G) light emitting element, the twenty-fifth sub-pixel PX25 may include a blue (B) light emitting element, the twenty-sixth sub-pixel PX26 may include a green (G) light emitting element, and the twenty-seventh sub-pixel PX27 may include a red (R) light emitting element.

In FIG. 4, according to an embodiment, only a blue (B) data voltage may be provided to the Aj-th sub-data line DAj, only a green (G) data voltage may be provided to the Bj-th sub-data line DBj, only a red (R) data voltage may be provided to the (Aj+1)-th sub-data line DAj+1, only the green (G) data voltage may be provided to the (Bj+1)-th sub-data line DBj+1, and only the blue (B) data voltage may be provided to the (Aj+2)-th sub-data line DAj+2.

Referring to FIGS. 2 and 4, an anode electrode of a light emitting element included in a red (R) sub-pixel among a plurality of sub-pixels connected to an even-numbered scan line may be connected to a second electrode of a driving transistor included in the blue (B) sub-pixel among sub-pixels connected to the same scan line. For example, the anode electrode of the light emitting element included in the twenty-third sub-pixel PX23 which is the red (R) sub-pixel among the plurality of sub-pixels connected to the second scan line SL2 may be connected to the second electrode of the driving transistor included in the twenty-fifth sub-pixel PX25, which is the blue (B) sub-pixel. Therefore, the twenty-third sub-pixel PX23 which is the red (R) sub-pixel may be driven by a data voltage of the (Aj+1)-th data line DAj+1 to which the red (R) data voltage is supplied, not the Aj-th sub-data line DAj to which the blue (B) data voltage is supplied.

Referring to FIGS. 2 and 4, an anode electrode of a light emitting element included in a blue (B) sub-pixel among a plurality of sub-pixels connected to an even-numbered scan line may be connected to a second electrode of a driving transistor included in a red (R) sub-pixel among sub-pixels connected to the same scan line. For example, the anode electrode of the light emitting element included in the twenty-fifth sub-pixel PX25, which is the blue (B) sub-pixel, among the plurality of sub-pixels connected to the second scan line SL2 may be connected to the second electrode of the driving transistor included in the twenty-seventh sub-pixel PX27 which is the red (R) sub-pixel. Therefore, the twenty-fifth sub-pixel PX25, which is the blue (B) sub-pixel, may be driven by a data voltage of the (Aj+2)-th sub-data line DAj+2 to which the blue (B) data voltage is supplied, not the (Aj+1)-th sub-data line DAj+1 to which the red (R) data voltage is supplied.

Figure 5:
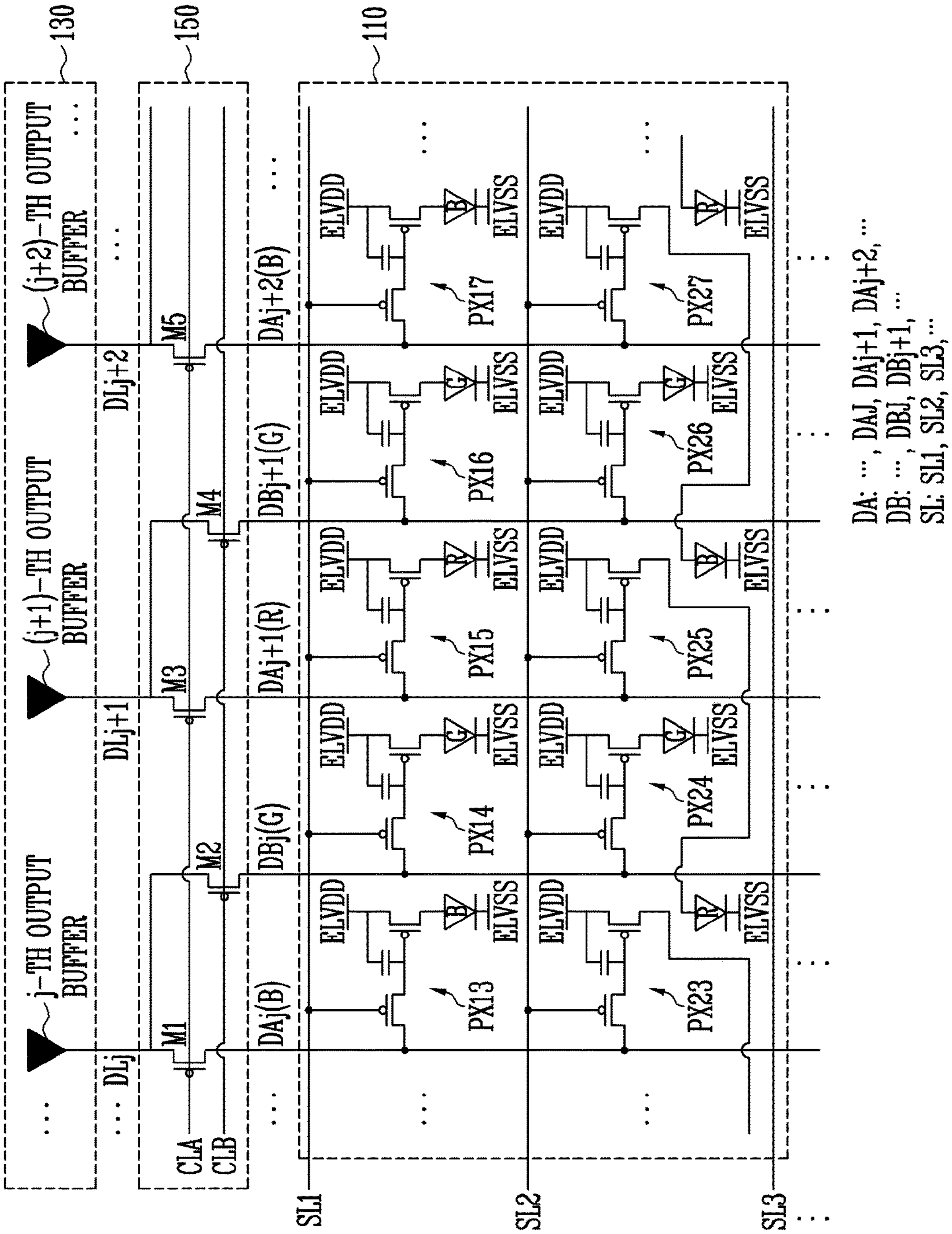
FIG. 5 is a diagram illustrating a data voltage output from a source driver to each of pixels when a display device according to an embodiment includes a demultiplexer.

FIG. 5 is a diagram illustrating a data voltage output from a source driver to each of pixels when a display device according to an embodiment includes a demultiplexer.

Referring to FIGS. 1 and 5, the display device 100 may include the source driver 130, the demultiplexer 150, and the pixel unit 110.

Referring to FIGS. 1 and 5, the demultiplexer 150 may include the plurality of select transistors M1, M2, M3, M4, M5, and . . . turned on and off according to the demultiplexer control signal DMCS. The demultiplexer control signal DMCS may include the first select signal CLA and the second select signal CLB.

Since the pixel unit 110 of FIG. 5 is the same as the pixel unit 110 of FIG. 4, a description of the pixel unit 110 of FIG. 5 overlapping that of FIG. 4 is omitted for convenience of explanation.

Referring to FIGS. 1 and 5, the source driver 130 may include a plurality of output buffers. Each output buffer may alternately output the blue (B) or red (R) data voltage and the green (G) data voltage to data lines DLs during one horizontal period corresponding to one scan line. For example, a j-th output buffer may alternately output the blue (B) data voltage and the green (G) data voltage to the j-th data line DLj during one horizontal period. A (j+1)-th output buffer may alternately output the red (R) data voltage and the green (G) data voltage to a (j+1)-th data line DLj+1 during one horizontal period. A (j+2)-th output buffer may alternately output the blue (B) data voltage and the green (G) data voltage to a (j+2)-th data line DLj+2 during one horizontal period.

The demultiplexer 150 may include the plurality of select transistors M1 to M5 connected between the plurality of data lines DLs and a plurality of sub-data lines DAs or DBs. For example, the first select transistor M1 may be connected between the j-th data line DLj and the Aj-th sub-data line DAj. The second select transistor M2 may be connected between the j-th data line DLj and the Bj-th sub-data line DBj. The third select transistor M3 may be connected between the (j+1)-th data line DLj+1 and the (Aj+1)-th sub-data line DAj+1. The fourth select transistor M4 may be connected between the (j+1)-th data line DLj+1 and the (Bj+1)-th sub-data line DBj+1. The fifth select transistor M5 may be connected between the (j+2)-th data line DLj+2 and the (Aj+2)-th sub-data line DAj+2. During one horizontal period, the first select signal CLA may be provided to gate electrodes of the first, third, and fifth select transistors M1, M3, and M5. During one horizontal period, the second select signal CLB may be provided to gate electrodes of the second and fourth select transistors M2 and M4. The plurality of select transistors M1 to M5 may be PMOS transistors. A gate-on voltage of the PMOS transistor may be a low level voltage and a gate off voltage may be a high level voltage. However, embodiments of the disclosure are not limited thereto. For example, in an embodiment, at least one of the plurality of select transistors M1 to M5 may be an NMOS transistor. A gate-on voltage of the NMOS transistor may be a high level voltage and a gate-off voltage may be a low level voltage.

The demultiplexer 150 may selectively transfer the red (R) or blue (B) data voltage and the green (G) data voltage output from each output buffer through one data line to two sub-data lines for each horizontal period.

For example, in the first horizontal period, while the blue (B) data voltage is output from the j-th output buffer, the j-th data line DLj and the Aj-th sub-data line DAj may be connected. At this time, the first select signal CLA that turns on the first select transistor may be provided to the gate electrode of the first select transistor M1. In the first horizontal period, while the green (G) data voltage is output from the j-th output buffer, the j-th data line DLj and the Bj-th sub-data line DBj may be connected. At this time, the first select transistor M1 may be turned off, and the second select signal CLB that turns on the second select transistor M2 may be provided to the gate electrode of the second select transistor M2.

For example, in the first horizontal period, while the red (R) data voltage is output from the (j+1)-th output buffer, the (j+1)-th data line DLj+1 and the (Aj+1)-th sub-data line DAj+1 may be connected. At this time, the first select signal CLA that turns on the third select transistor may be provided to the gate electrode of the third select transistor M3. In the first horizontal period, while the green (G) data voltage is output from the (j+1)-th output buffer, the (j+1)-th data line DLj+1 and the (Bj+1)-th sub-data line DBj+1 may be connected. At this time, the third select transistor M3 may be turned off, and the second select signal CLB that turns on the fourth select transistor M4 may be provided to the gate electrode of the fourth select transistor M4.

For example, in the first horizontal period, while the blue (B) data voltage is output from the (j+2)-th output buffer, the (j+2)-th data line DLj+2 and the (Aj+2)-th sub-data line DAj+2 may be connected. At this time, the first select signal CLA that turns on the fifth select transistor may be provided to the gate electrode of the fifth select transistor M5.

Since a method in which the demultiplexer 150 selectively transfers the red (R) or blue (B) data voltage and the green (G) data voltage output from each output buffer through one data line to two sub-data lines for each horizontal period in the second horizontal period is the same as that in the first horizontal period, a further description thereof is omitted for convenience of explanation.

Figure 6:
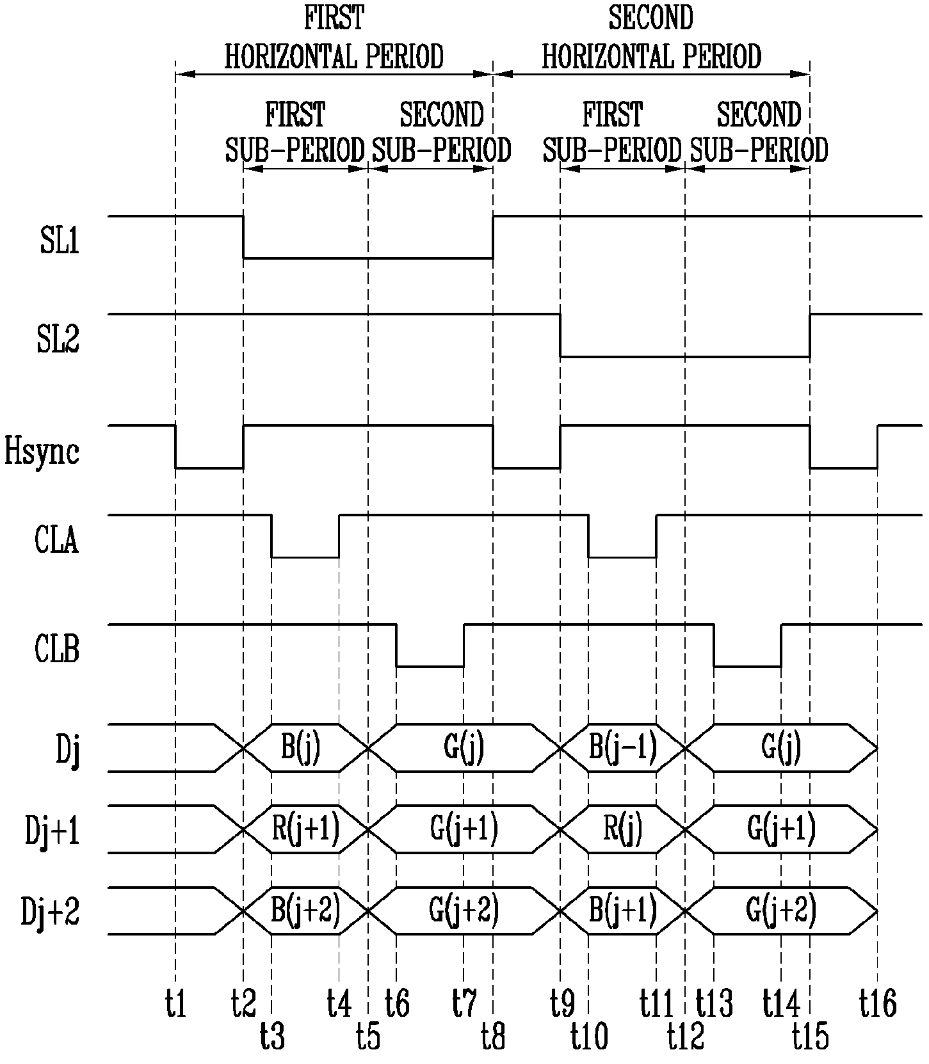
FIG. 6 is a timing diagram illustrating a data voltage and driving control signals provided to each of sub-pixels according to a time in a display device according to an embodiment.

FIG. 6 is a timing diagram illustrating a data voltage and driving control signals provided to each of sub-pixels according to a time in a display device according to an embodiment.

Hereinafter, an operation according to a time of a display device according to an embodiment is described with reference to FIGS. 3, 5, and 6.

Referring to FIG. 6, one horizontal period may be defined by the horizontal synchronization signal Hsync. According to the horizontal synchronization signal Hsync, the first horizontal period may be from t1 to t8, and the second horizontal period may be from t8 to t15. In an embodiment, each horizontal period may include a first sub-period and a second sub-period. The first sub-period may be a period in which the red (R) or blue (B) data voltage is output from the source driver 130, and the second sub-period may be a period in which the green (G) data voltage is output from the source driver 130.

A first scan signal may be provided to the first scan line SL1 from t2 to t8. When the first scan signal is provided to the first scan line SL1, the switching transistor T1 included in each of the sub-pixels PX13 to PX17 connected to the first scan line SL1 may be turned on.

A period from t2 to t5 may be the first sub-period of the first horizontal period. During the first sub-period, a blue (B) data voltage B(j) may be provided to the j-th data line DLj through the j-th output buffer. At this time, the blue (B) data voltage B(j) provided through the j-th output buffer may be a voltage corresponding to the blue (B) light emitting element included in the thirteenth sub-pixel PX13 in FIG. 5. A red (R) data voltage R(j+1) may be provided to the (j+1)-th data line DLj+1 through the (j+1)-th output buffer. At this time, the red (R) data voltage R(j+1) provided through the (j+1)-th output buffer may be a voltage corresponding to the red (R) light emitting element included in the fifteenth sub-pixel PX15 in FIG. 5. A blue (B) data voltage B(j+2) may be provided to the (j+2)-th data line DLj+2 through the (j+2)-th output buffer. At this time, the blue (B) data voltage B(j+2) provided through the (j+2)-th output buffer may be a voltage corresponding to the blue (B) light emitting element included in the seventeenth sub-pixel PX17 in FIG. 5.

The first select signal CLA may be provided to the gate electrode of the first select transistor M1, the gate electrode of the third select transistor M3, and the gate electrode of the fifth select transistor M5 from t3 to t4. Accordingly, the blue (B) data voltage B(j) provided to the j-th data line DLj may be stored in the storage capacitor of the thirteenth sub-pixel PX13 through the Aj-th sub-data line DAj, the red (R) data voltage R(j+1) provided to the (j+1)-th data line DLj+1 may be stored in the storage capacitor of the fifteenth sub-pixel PX15 through the (Aj+1)-th sub-data line DAj+1, and the blue (B) data voltage B(j+2) provided to the (j+2)-th data line DLj+2 may be stored in the storage capacitor of the seventeenth sub-pixel PX17 through the (Aj+2)-th sub-data line DAj+2.

A period from t5 to t8 may be the second sub-period of the first horizontal period. During the second sub-period, a green (G) data voltage G(j) may be provided to the j-th data line DLj through the j-th output buffer. At this time, the green (G) data voltage G(j) provided through the j-th output buffer may be a voltage corresponding to the green (G) light emitting element included in the fourteenth sub-pixel PX14 in FIG. 5. A green (G) data voltage G(j+1) may be provided to the (j+1)-th data line DLj+1 through the (j+1)-th output buffer. At this time, the green (G) data voltage G(j+1) provided through the (j+1)-th output buffer may be a voltage corresponding to the green (G) light emitting element included in the sixteenth sub-pixel PX16 in FIG. 5. A green (G) data voltage G(j+2) may be provided to the (j+2)-th data line DLj+2 through the (j+2)-th output buffer.

The second select signal CLB may be provided to the gate electrode of the second select transistor M2 and the gate electrode of the fourth select transistor M4 from t6 to t7. Accordingly, the green (G) data voltage G(j) provided to the j-th data line DLj may be stored in the storage capacitor of the fourteenth sub-pixel PX14 through the Bj-th sub-data line DBj, and the green (G) data voltage G(j+1) provided to the (j+1)-th data line DLj+1 may be stored in the storage capacitor of the sixteenth sub-pixel PX16 through the (Bj+1)-th sub-data line DBj+1.

A second scan signal may be provided to the second scan line SL2 from t9 to t15. When the second scan signal is provided to the second scan line SL2, the switching transistor T1 included in each of the sub-pixels PX23 to PX27 connected to the second scan line SL2 may be turned on.

A period from t9 to t12 may be the first sub-period of the second horizontal period. During the first sub-period, a blue (B) data voltage B(j−1) may be provided to the j-th data line DLj through the j-th output buffer. At this time, the blue (B) data voltage B(j−1) provided through the j-th output buffer may be a voltage corresponding to the blue (B) light emitting element included in the blue (B) sub-pixel connected to the second scan line SL2 and the (Aj-1)-th sub-data line DAj−1 (not shown). A red (R) data voltage Rj) may be provided to the (j+1)-th data line DLj+1 through the (j+1)-th output buffer. At this time, the red (R) data voltage Rj) provided through the (j+1)-th output buffer may be a voltage corresponding to the red (R) light emitting element included in the twenty-third sub-pixel PX23 in FIG. 5. A blue (B) data voltage B(j+1) may be provided to the (j+2)-th data line Dj+2 through the (j+2)-th output buffer. At this time, the blue (B) data voltage B(j+1) provided through the (j+2)-th output buffer may be a voltage corresponding to the blue (B) light emitting element included in the twenty-fifth sub-pixel PX25 in FIG. 5.

The first select signal CLA may be provided to the gate electrode of the first select transistor M1, the gate electrode of the third select transistor M3, and the gate electrode of the fifth select transistor M5 from t10 to t11. Accordingly, the blue (B) data voltage B(j−1) provided to the j-th data line DLj may be stored in the storage capacitor of the twenty-third sub-pixel PX23 through the Aj-th sub-data line DAj. In this case, the blue (B) light emitting element included in the blue (B) sub-pixel connected to the second scan line SL2 and the (Aj-1)-th sub data line DAj−1 may emit light based on the blue (B) data voltage B(j−1) stored in the storage capacitor of the twenty-third sub-pixel PX23. The red (R) data voltage Rj) provided to the j+1)-th data line DLj+1 may be stored in the storage capacitor of the twenty-fifth sub-pixel PX25 through the (Aj+1)-th sub-data line DAj+1. In this case, the red (R) light emitting element included in the twenty-third sub-pixel PX23 may emit light based on the red (R) data voltage Rj) stored in the storage capacitor of the twenty-fifth sub-pixel PX25. The blue (B) data voltage B(j+1) provided to the j+2)-th data line DLj+2 may be stored in the storage capacitor of the twenty-seventh sub-pixel PX27 through the (Aj+2)-th sub-data line DAj+2. In this case, the blue (B) light emitting element included in the twenty-fifth sub-pixel PX25 may emit light based on the blue (B) data voltage B(j+1) stored in the storage capacitor of the twenty-seventh sub-pixel PX27.

That is, since the anode electrode of the red (R) light emitting element included in the twenty-third sub-pixel PX23 is connected to the second electrode of the driving transistor included in the twenty-fifth sub-pixel PX25, emission of the red (R) light emitting element included in the twenty-third sub-pixel PX23 may be controlled according to the red (R) data voltage provided to the (Aj+1)-th sub-data line DAj+1 through the (j+1)-th data line DLj+1. In addition, since the anode electrode of the blue (B) light emitting element included in the twenty-fifth sub-pixel PX25 is connected to the second electrode of the driving transistor included in the twenty-seventh sub-pixel PX27, emission of the blue (B) light emitting element included in the twenty-fifth sub-pixel PX25 may be controlled according to the blue (B) data voltage provided to the (Aj+2)-th sub-data line DAj+2 through the (j+2)-th data line DLj+2.

A period from t12 to t15 may be the second sub-period of the second horizontal period. During the second sub-period, the green (G) data voltage G(j) may be provided to the j-th data line Dj through the j-th output buffer. At this time, the green (G) data voltage G(j) provided through the j-th output buffer may be a voltage corresponding to the green (G) light emitting element included in the twenty-fourth sub-pixel PX24 in FIG. 5. The green (G) data voltage G(j+1) may be provided to the (j+1)-th data line DLj+1 through the (j+1)-th output buffer. At this time, the green (G) data voltage G(j+1) provided through the (j+1)-th output buffer may be a voltage corresponding to the green (G) light emitting element included in the twenty-sixth sub-pixel PX26 in FIG. 5. The green (G) data voltage G(j+1) may be provided to the (j+2)-th data line DLj+2 through the (j+2)-th output buffer.

The second select signal CLB may be provided to the gate electrode of the second select transistor M2 and the gate electrode of the fourth select transistor M4 from t13 to t14. Accordingly, the green (G) data voltage G(j) provided to the j-th data line DLj may be stored in the storage capacitor of the twenty-fourth sub-pixel PX24 through the Bj-th sub-data line DBj, and the green (G) data voltage G(j+1) provided to the (j+1)-data line DLj+1 may be stored in the storage capacitor of the twenty-sixth sub-pixel PX26 through the (Bj+1)-th sub-data line DBj+1.

Since a data voltage applied to the sub-pixels through the first and second select signals CLA and CLB and each data line during a third horizontal period are the same as that of the first horizontal period, a further description thereof is omitted for convenience of explanation. In addition, an operation of the sub-pixels connected to the third scan line during the third horizontal period is the same as an operation of the sub-pixels connected to the first scan line during the first horizontal period, and thus, a further description thereof is omitted for convenience of explanation.

As described with reference to FIGS. 5 and 6, among the plurality of sub-pixels connected to the even-numbered scan line, the anode electrode of the light emitting element included in the blue (B) sub-pixel may be connected to the second electrode of the driving transistor included in the red (R) sub-pixel among the sub-pixels connected to the same scan line, and the anode electrode of the light emitting element included in the red (R) sub-pixel is connected to the second electrode of the driving transistor included in the blue (B) sub-pixel among the sub-pixels connected to the same scan line. Therefore, a voltage corresponding to one color may be provided to each sub-data line. Accordingly, in embodiments, gamma switching may be minimized or reduced during driving the display device, and thus, power consumption may be reduced.

In an embodiment, among the plurality of sub-pixels connected to the even-numbered scan line, emission of the light emitting element included in the blue (B) sub-pixel may be controlled according to the blue (B) data voltage provided to the sub-data line connected to a red (R) sub-pixel most adjacent to the light emitting element among the sub-pixels connected to the same scan line. In addition, in an embodiment, among the plurality of sub-pixels connected to the even-numbered scan line, emission of the light emitting element included in the red (R) sub-pixel may be controlled according to the red (R) data voltage provided to the sub-data line connected to a blue (B) sub-pixel most adjacent to the light emitting element among the sub-pixels connected to the same scan line.

An embodiment in which the anode electrode of the light emitting element included in the blue (B) or red (R) sub-pixel connected to the even-numbered scan line is connected to the second electrode of the driving transistor included in the red (R) or blue (B) sub-pixel among the sub-pixels connected to the same scan line is described, and it is to be understood that the description may be identically applied to the blue (B) or red (R) pixel connected to the odd-numbered scan line. For example, in an embodiment, the anode electrode of the light emitting element included in the blue (B) or red (R) sub-pixel connected to the odd-numbered scan line, not the even-numbered scan line, may be connected to the second electrode of the driving transistor included in the red (R) sub-pixel among the sub-pixels connected to the same scan line.

FIG. 7 is a timing diagram illustrating a data voltage and driving control signals provided to each of sub-pixels in a display device according to an embodiment.

Hereinafter, an operation according to a time of a display device according to an embodiment is described with reference to FIGS. 3, 5, and 7.

Referring to FIG. 7, according to the horizontal synchronization signal Hsync, the first horizontal period may be from t1' to t4', and the second horizontal period may be from t5' to t7'. In an embodiment, each horizontal period may include a first sub-period and a second sub-period. The first sub-period may be a period in which the red (R) or blue (B) data voltage is output from the source driver 130, and the second sub-period may be a period in which the green (G) data voltage is output from the source driver 130.

A first scan signal may be provided to the first scan line SL1 from t2' to t4'. When the first scan signal is provided to the first scan line SL1, the switching transistor T1 included in each of the sub-pixels PX13 to PX17 connected to the first scan line SL1 may be turned on.

A period from t2' to t3' may be the first sub-period of the first horizontal period. During the first sub-period, a blue (B) data voltage B(j) may be provided to the j-th data line DLj through the j-th output buffer. At this time, the blue (B) data voltage B(j) provided through the j-th output buffer may be a voltage corresponding to the blue (B) light emitting element included in the thirteenth sub-pixel PX13 in FIG. 5. A red (R) data voltage R(j+1) may be provided to the (j+1)-th data line DLj+1 through the (j+1)-th output buffer. At this time, the red (R) data voltage R(j+1) provided through the (j+1)-th output buffer may be a voltage corresponding to the red (R) light emitting element included in the fifteenth sub-pixel PX15 in FIG. 5. A blue (B) data voltage B(j+2) may be provided to the (j+2)-th data line DLj+2 through the (j+2)-th output buffer. At this time, the blue (B) data voltage B(j+2) provided through the (j+2)-th output buffer may be a voltage corresponding to the blue (B) light emitting element included in the seventeenth sub-pixel PX17 in FIG. 5.

The first select signal CLA may be provided to the gate electrode of the first select transistor M1, the gate electrode of the third select transistor M3, and the gate electrode of the fifth select transistor M5 from t2' to t3'. Accordingly, the blue (B) data voltage B(j) provided to the j-th data line DLj may be stored in the storage capacitor of the thirteenth sub-pixel PX13 through the Aj-th sub-data line DAj, the red (R) data voltage R(j+1) provided to the (j+1)-th data line DLj+1 may be stored in the storage capacitor of the fifteenth sub-pixel PX15 through the (Aj+1)-th sub-data line DAj+1, and the blue (B) data voltage B(j+2) provided to the (j+2)-th data line DLj+2 may be stored in the storage capacitor of the seventeenth sub-pixel PX17 through the (Aj+2)-th sub-data line DAj+2.

A period from t3' to t4' may be the second sub-period of the first horizontal period. During the second sub-period, a green (G) data voltage G(j) may be provided to the j-th data line DLj through the j-th output buffer. At this time, the green (G) data voltage G(j) provided through the j-th output buffer may be a voltage corresponding to the green (G) light emitting element included in the fourteenth sub-pixel PX14 in FIG. 5. A green (G) data voltage G(j+1) may be provided to the (j+1)-th data line DLj+1 through the (j+1)-th output buffer. At this time, the green (G) data voltage G(j+1) provided through the (j+1)-th output buffer may be a voltage corresponding to the green (G) light emitting element included in the sixteenth sub-pixel PX16 in FIG. 5. A green (G) data voltage G(j+2) may be provided to the (j+2)-th data line DLj+2 through the (j+2)-th output buffer.

The second select signal CLB may be provided to the gate electrode of the second select transistor M2 and the gate electrode of the fourth select transistor M4 from t3' to t4'. Accordingly, the green (G) data voltage G(j) provided to the j-th data line DLj may be stored in the storage capacitor of the fourteenth sub-pixel PX14 through the Bj-th sub-data line DBj, and the green (G) data voltage G(j+1) provided to the (j+1)-th data line DLj+1 may be stored in the storage capacitor of the sixteenth sub-pixel PX16 through the (Bj+1)-th sub-data line DBj+1. At this time, unlike an embodiment as described with reference to FIG. 6, the second select signal CLB may be successively provided to the gate electrode of the second and fourth select transistors M2 and M4 until t6', also after t4', which is a time point when the second sub-period of the first horizontal period is ended. The time point t6' may be a time point when the first sub-period of the second horizontal period is ended. Accordingly, also after t4', which is the time point when the second sub-period of the first horizontal period is ended, the second and fourth select transistors M2 and M4 may maintain a turn-on state until the time point when the first sub-period of the second horizontal period is ended.

A second scan signal may be provided to the second scan line SL2 from t5' to t7'. When the second scan signal is provided to the second scan line SL2, the switching transistor T1 included in each of the sub-pixels PX23 to PX27 connected to the second scan line SL2 may be turned on.

A period from t5' to t6' may be the first sub-period of the second horizontal period. During the first sub-period, a green (G) data voltage G(j) may be provided to the j-th data line Dj through the j-th output buffer. At this time, the green (G) data voltage G(j) provided through the j-th output buffer may be a voltage corresponding to the green (G) light emitting element included in the twenty-fourth sub-pixel PX24 in FIG. 5. A green (G) data voltage G(j+1) may be provided to the (j+1)-th data line DLj+1 through the (j+1)-th output buffer. At this time, the green (G) data voltage G(j+1) provided through the (j+1)-th output buffer may be a voltage corresponding to the green (G) light emitting element included in the twenty-sixth sub-pixel PX26 in FIG. 5. A green (G) data voltage G(j+2) may be provided to the (j+2)-th data line DLj+2 through the (j+2)-th output buffer. Unlike an embodiment as described with reference to FIG. 6, the data voltage provided through the data lines DLs in the first sub-period of the second horizontal period may be the green (G) data voltage, not the blue (B) or red (R) data voltage.

Since the second select signal CLB is successively provided from t3' to t6', the second and fourth select transistors M2 and M4 may be continuously turned on from t3' to t6'. Accordingly, the green (G) data voltage G(j) provided to the j-th data line DLj may be stored in the storage capacitor of the twenty-fourth sub-pixel PX24 through the Bj-th sub-data line DBj, and the green (G) data voltage G(j+1) provided to the (j+1)-th data line may be stored in the storage capacitor of the twenty-sixth sub-pixel PX26 through the (Bj+1)-th sub-data line DBj+1.

A period from t6' to t7' may be the second sub-period of the second horizontal period. A blue (B) data voltage B(j−1) may be provided to the j-th data line DLj through the j-th output buffer. At this time, the blue (B) data voltage B(j−1) provided through the j-th output buffer may be a voltage corresponding to the blue (B) light emitting element included in the blue (B) sub-pixel connected to the second scan line SL2 and the (Aj-1)-th sub-data line DAj−1. A red (R) data voltage R(j) may be provided to the (j+1)-th data line DLj+1 through the (j+1)-th output buffer. At this time, the red (R) data voltage R(j) provided through the (j+1)-th output buffer may be a voltage corresponding to the red (R) light emitting element included in the twenty-third sub-pixel PX23 in FIG. 5. A blue (B) data voltage B(j+1) may be provided to the (j+2)-th data line Dj+2 through the (j+2)-th output buffer. At this time, the blue (B) data voltage B(j+1) provided through the (j+2)-th output buffer may be a voltage corresponding to the blue (B) light emitting element included in the twenty-fifth sub-pixel PX25 in FIG. 5.

The first select signal CLA may be provided to the gate electrode of the first select transistor M1, the gate electrode of the third select transistor M3, and the gate electrode of the fifth select transistor M5 from t6' to t7'. Accordingly, the blue (B) data voltage B(j−1) provided to the j-th data line DLj may be stored in the storage capacitor of the twenty-third sub-pixel PX23 through the Aj-th sub-data line DAj. In this case, the blue (B) light emitting element included in the blue (B) sub-pixel connected to the second scan line SL2 and the (Aj-1)-th sub data line DAj−1 may emit light based on the blue (B) data voltage B(j−1) stored in the storage capacitor of the twenty-third sub-pixel PX23. The red (R) data voltage R(j) provided to the (j+1)-th data line DLj+1 may be stored in the storage capacitor of the twenty-fifth sub-pixel PX25 through the (Aj+1)-th sub-data line DAj+1. In this case, the red (R) light emitting element included in the twenty-third sub-pixel PX23 may emit light based on the red (R) data voltage R(j) stored in the storage capacitor of the twenty-fifth sub-pixel PX25. The blue (B) data voltage B(j+1) provided to the (j+2)-th data line DLj+2 may be stored in the storage capacitor of the twenty-seventh sub-pixel PX27 through the (Aj+2)-th sub-data line DAj+2. In this case, the blue (B) light emitting element included in the twenty-fifth sub-pixel PX25 may emit light based on the blue (B) data voltage B(j+1) stored in the storage capacitor of the twenty-seventh sub-pixel PX27. At this time, unlike an embodiment as described with reference to FIG. 6, the first select signal CLA may be successively provided to the gate electrodes of the first, third, and fifth select transistors M1, M3, and M5 also after t7', which is a time point when the second sub-period of the second horizontal period is ended. t9' may be a time point when the first sub-period of the third horizontal period is ended. Accordingly, also after t7', which is the time point when the second sub-period of the second horizontal period is ended, the first, third, and fifth select transistors M1, M3, and M5 may maintain a turn-on state at the time point when the first sub-period of the third horizontal period is ended.

In FIG. 7, since a data voltage and driving control signals provided to each of the sub-pixels connected to the third scan line SL3 according to a time during the third horizontal period are the same as the data voltage and the driving control signals provided to each of the sub-pixels connected to the first scan line SL1 according to a time during the first horizontal period, a further description thereof is omitted for convenience of explanation.

Compared to an embodiment according to FIG. 6, in an embodiment according to FIG. 7, each output buffer may first output the blue (B) or red (R) data voltage, and then output the green (G) data voltage during the first horizontal period, and may first output the green (G) data voltage, and then output the blue (B) or red (R) data voltage during the second horizontal period. Accordingly, the number of times of gamma switching during driving of the display device may be further reduced compared.

In addition, according to an embodiment of FIG. 7, a driving frequency of the first and second select signals CLA and CLB provided to the demultiplexer 150 may be reduced compared to that of an embodiment of FIG. 6. Accordingly, power consumption of the display device according to an embodiment of FIG. 7 may be further reduced.

Figure 8:
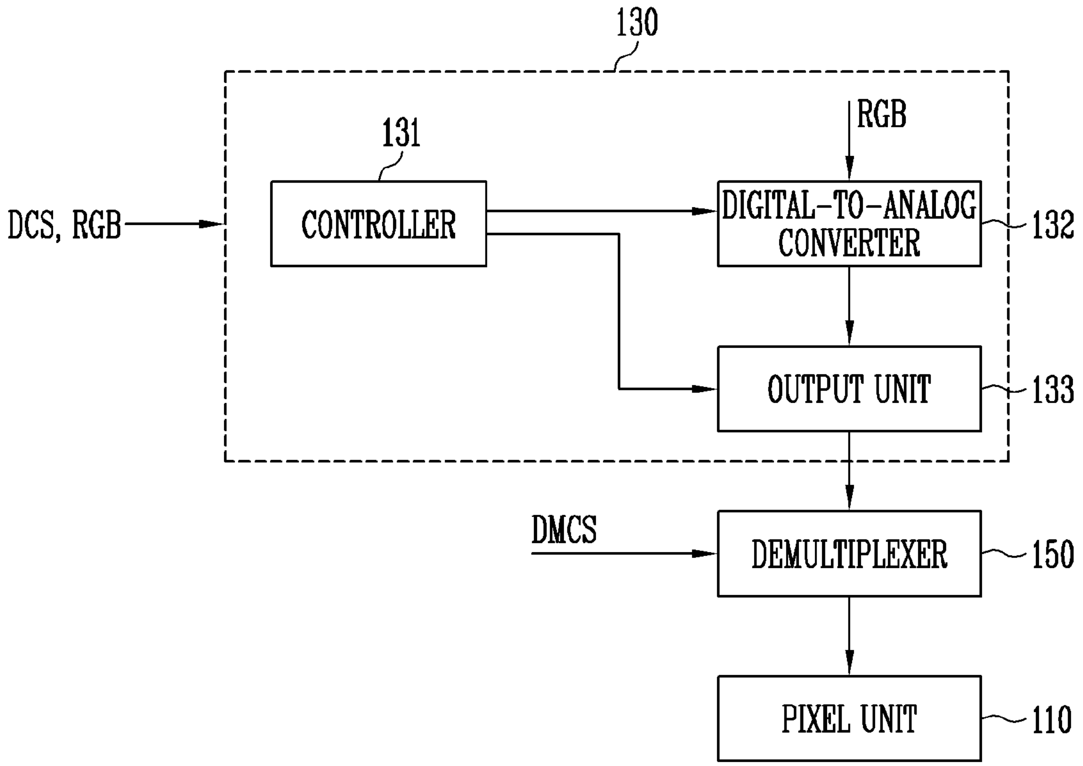
FIG. 8 is a block diagram illustrating an operation of a display device according to an embodiment.

FIG. 8 is a block diagram illustrating an operation of a display device according to an embodiment.

The source driver 130, the demultiplexer 150, and the pixel unit 110 of FIG. 8 may be the same as the source driver 130, the demultiplexer 150, and the pixel unit 110 of FIG. 1, respectively. As described with reference to FIG. 1, the demultiplexer 150 may be included in the source driver 130. Referring to FIG. 8, the source driver 130 may include a controller 131, a digital-to-analog converter 132, and an output unit 133.

The source driver 130 may receive the data driving control signal DCS and the image data RGB from the timing controller 140 of FIG. 1. The controller 131 may control the digital-to-analog converter 132 and the output unit 133 based on the data driving control signal DCS.

For example, the digital-to-analog converter 132 may convert a signal corresponding to red (R), blue (B), or green (G) included in the image data RGB received from outside of the source driver 130 into the red (R) data voltage, the blue (B) data voltage, or the green (G) data voltage, each of which is an analog voltage, respectively.

The output unit 133 may include a plurality of output buffers. Each of the plurality of output buffers included in the output unit 133 may alternately output the red (R) or blue (B) data voltage and the green (G) data voltage during one horizontal period. That is, each of the output buffers included in the output unit 133 may alternately output the red (R) and green (G) data voltages or alternately output the blue (B) and green (G) data voltages during one horizontal period. In an embodiment, each output buffer may alternately output the red (R) or blue (B) data voltage and the green (G) data voltage corresponding to each horizontal period for each horizontal period. The output unit 133 may also be referred to as an output buffer unit or an output buffer device.

In an embodiment, the output unit 133 may first output the red (R) or blue (B) data voltage, and then output the green (G) data voltage during the first horizontal period. The output unit 133 may first output the red (R) or blue (B) data voltage, and then output the green (G) data voltage during the second horizontal period, which is a next horizontal period of the first horizontal period. The second (next) horizontal period may refer to, for example, a horizontal period subsequent to the first horizontal period. For example, in embodiments, the second (next) horizontal period may refer to a horizontal period immediately subsequent to the first horizontal period.

In an embodiment, the output unit 133 may first output the red (R) or blue (B) data voltage, and then output the green (G) data voltage during the first horizontal period. The output unit 133 may first output the green (G) data voltage, and then output the red (R) or blue (B) data voltage during the second horizontal period, which is the next horizontal period of the first horizontal period. The second (next) horizontal period may refer to, for example, a horizontal period subsequent to the first horizontal period. For example, in embodiments, the second (next) horizontal period may refer to a horizontal period immediately subsequent to the first horizontal period. The data voltages output from the output unit 133 may be transferred to the demultiplexer 150 through a data line corresponding to each output buffer.

The demultiplexer 150 may selectively transfer the red (R) or blue (B) data voltage and the green (G) data voltage output from each output buffer included in the output unit 133 through the data line to the pixel unit 110 through the first sub-data line and the second sub-data line for each horizontal period, according to the demultiplexer control signal DMCS received from the timing controller 140.

In an embodiment, each horizontal period may include the first sub-period and the second sub-period, which is a next period of the first sub-period. The second (next) sub-period may refer to, for example, a period subsequent to the first sub-period. For example, in embodiments, the second (next) sub-period may refer to a period immediately subsequent to the first sub-period. The demultiplexer 150 may transfer the red (R) or blue (B) data voltage from the output buffer to the first sub-data line during the first sub-period in one horizontal period, and transfer the green (G) data voltage from the output buffer to the second sub-data line during the second sub-period.

In an embodiment, the demultiplexer 150 may transfer the red (R) or blue (B) data voltage from the output buffer to the first sub-data line during the first sub-period of the first horizontal period. The demultiplexer 150 may transfer the green (G) data voltage from the output buffer to the second sub-data line during the second sub-period of the first horizontal period. The demultiplexer 150 may transfer the green (G) data voltage from the output buffer to the second sub-data line during the first sub-period of the second horizontal period. The demultiplexer 150 may transfer the red (R) or blue (B) data voltage from the output buffer to the first sub-data line during the second sub-period of the second horizontal period.

The pixel unit 110 may include a plurality of pixel columns each including a plurality of pixels. A structure of the plurality of pixels included in the pixel unit 110 may be the same as the pixel structure of FIG. 2. The pixel unit 110 may include a plurality of pixel columns including a plurality of pixels. Each pixel column may correspond to each sub-data line in a one-to-one correspondence. The data voltage transferred from the demultiplexer 150 to the pixel unit through the sub-data line may be the same as that described with reference to FIGS. 5 to 7.

Figure 9:
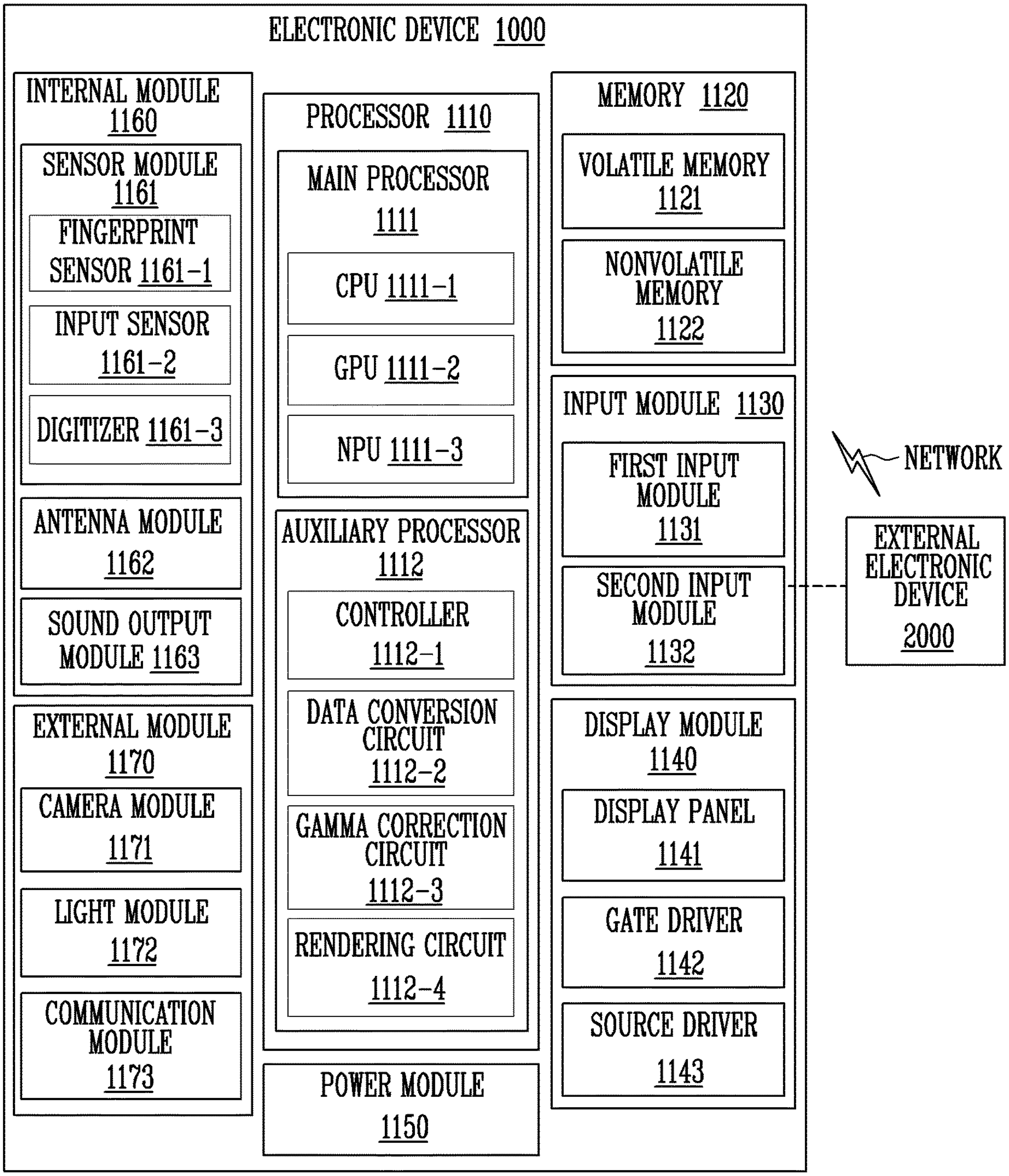
FIG. 9 is a diagram illustrating an electronic device according to an embodiment.

FIG. 9 is a diagram illustrating an electronic device according to an embodiment.

The electronic device 1000 outputs various pieces of information through a display module 1140 within an operating system. The display module 1140 may also be referred to as a display device. The display module 1140 may correspond to at least a portion of the display device 100 of FIG. 1. When a processor 1110 executes an application stored in a memory 1120, the display module 1140 provides application information to a user through a display panel 1141. The display panel 1141 may be a configuration corresponding to the pixel unit 110 of FIG. 1.

The processor 1110 obtains an external input through an input module 1130 or a sensor module 1161 and executes an application corresponding to the external input. For example, when the user selects a camera icon displayed on the display panel 1141, the processor 1110 obtains a user input through an input sensor 1161-2 and activates a camera module 1171. The processor 1110 transmits image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 obtains input fingerprint information as input data. The processor 1110 compares input data obtained through the fingerprint sensor 1161-1 with authentication data stored in a memory 1120 and executes an application according to a comparison result. The display module 1140 may display information executed according to a logic of the application through the display panel 1141.

As still another example, when a music streaming icon displayed on the display module 1140 is selected, the processor 1110 obtains a user input through the input sensor 1161-2 and activates a music streaming application stored in the memory 1120. When a music execution command is input in the music streaming application, the processor 1110 activates a sound output module 1163 to provide sound information corresponding to the music execution command to the user.

An operation of the electronic device 1000 according to an embodiment is briefly described above. Hereinafter, a configuration of the electronic device 1000 is described in further detail. Some of the configurations of the electronic device 1000 described below may be integrated and provided as one configuration, and one configuration may be separated into two or more configurations.

Referring to FIG. 9, the electronic device 1000 may communicate with an external electronic device 2000 through a network (for example, a short-range wireless communication network or a long-range wireless communication network). According to an embodiment, the electronic device 1000 may include a processor 1110, a memory 1120, an input module 1130, a display module 1140, a power module 1150, an internal module 1160, and an external module 1170. According to an embodiment, in the electronic device 1000, at least one of the above-described components may be omitted or one or more other components may be added. According to an embodiment, some of the above-described components (for example, the sensor module 1161, an antenna module 1162, or the sound output module 1163) may be integrated into another component (for example, the display module 1140).

The processor 1110 may execute software to control at least another component (for example, a hardware or software component) of the electronic device 1000 connected to the processor 1110, and perform various data processing operations. According to an embodiment, as at least a portion of the data processing operation, the processor 1110 may store a command or data received from another component (for example, the input module 1130, the sensor module 1161, or a communication module 1173) in a volatile memory 1121 and process the command or the data stored in the volatile memory 1121, and resulting data may be stored in a nonvolatile memory 1122.

The processor 1110 may include a main processor 1111 and an auxiliary processor 1112. The auxiliary processor 1112 may correspond to the timing controller 140 of FIG. 1.

The main processor 1111 may include one or more of a central processing unit (CPU) 1111-1 or an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU is a processor specialized in processing an artificial intelligence model, which may be generated through machine learning. The artificial intelligence model may include a plurality of artificial neural network layers. The artificial neural network may be one of, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but is not limited thereto. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 1112 may include a controller 1112-1. The controller 1112-1 may include an interface conversion circuit and a timing control circuit. The controller 1112-1 receives an image signal from the main processor 1111, converts a data format of the image signal to correspond to an interface specification with the display module 1140, and outputs image data. The controller 1112-1 may output various control signals utilized for driving the display module 1140.

The auxiliary processor 1112 may further include a data conversion circuit 1112-2, a gamma correction circuit 1112-3, a rendering circuit 1112-4, and the like. The data conversion circuit 1112-2 may receive the image data from the controller 1112-1, compensate the image data to display an image with a desired luminance according to a characteristic of the electronic device 1000, a setting of the user, or the like, or convert the image data for reduction of power consumption, afterimage compensation, or the like. The gamma correction circuit 1112-3 may convert the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000. At least one of the data conversion circuit 1112-2, the gamma correction circuit 1112-3, and the rendering circuit 1112-4 may be integrated into another component (for example, the main processor 1111 or the controller 1112-1). At least one of the data conversion circuit 1112-2, the gamma correction circuit 1112-3, and the rendering circuit 1112-4 may be integrated into a source driver 1143 to be described further below.

The memory 1120 may store various data used by at least one component (for example, the processor 1110 or the sensor module 1161) of the electronic device 1000, and input data or output data for a command related thereto. The memory 1120 may include at least one of the volatile memory 1121 and the nonvolatile memory 1122.

The input module 1130 may receive a command or data to be used by a component (for example, the processor 1110, the sensor module 1161, or the sound output module 1163) of the electronic device 1000 from outside of the electronic device 1000 (for example, from the user or the external electronic device 2000).

The input module 1130 may include a first input module 1131 to which a command or data is input from the user and a second input module 1132 to which a command or data is input from the external electronic device 2000. The first input module 1131 may include, for example, a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include, for example, a high definition multimedia interface (HDMI), a universal serial bus (USB) interface, an SD card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 visually provides information to the user. The display module 1140 may include, for example, a display panel 1141, a gate driver 1142, and a source driver 1143. The gate driver 1142 and the source driver 1143 may correspond to the gate driver 120 and the source driver 130 of FIG. 1, respectively. The display panel 1141 may correspond to the pixel unit 110 of FIG. 1. The display module 1140 may further include, for example, a window, a chassis, and a bracket, which may protect the display panel 1141.

The display panel 1141 (or a display) may include, for example, a liquid crystal display panel, an organic light emitting display panel, or an inorganic light emitting display panel. However, the type of the display panel 1141 is not particularly limited. The display panel 1141 may be a rigid type or a flexible type that may be rolled or folded. The display module 1140 may further include, for example, a supporter, a bracket, a heat dissipation member, or the like that supports the display panel 1141.

The gate driver 1142 may be mounted on the display panel 1141 as a driving chip. In addition, the gate driver 1142 may be integrated in the display panel 1141. For example, the gate driver 1142 may include an amorphous silicon TFT gate driver circuit (ASG), a low temperature polycrystalline silicon (LTPS) TFT gate driver circuit, or an oxide semiconductor TFT gate driver circuit (OSG) built in the display panel 1141. The gate driver 1142 receives a control signal from the controller 1112-1 and outputs scan signals to the display panel 1141 in response to the control signal.

The display module 1140 may further include an emission driver. The emission driver outputs an emission control signal to the display panel 1141 in response to the control signal received from the controller 1112-1. The emission driver may be formed separately from the gate driver 1142 or may be integrated into the gate driver 1142.

The source driver 1143 receives a control signal from the controller 1112-1, converts image data into an analog voltage (for example, a data voltage) in response to the control signal, and then outputs the data voltages to the display panel 1141.

The source driver 1143 may be integrated into another component (for example, the controller 1112-1). A function of the interface conversion circuit and the timing control circuit of the controller 1112-1 described above may be integrated into the source driver 1143. In an embodiment, the source driver 1143 may further include a configuration identical to that of the demultiplexer 150 of FIG. 1.

The display module 1140 may further include an emission driver, a voltage generation circuit, and the like. The voltage generation circuit may output various voltages utilized for driving the display panel 1141.

In an embodiment, the display panel 1141 may include a plurality of pixel columns each including a plurality of pixels. In an embodiment, the display panel 1141 may have the same configuration as the demultiplexer 150 of FIG. 1.

In an embodiment, the source driver 1143 may convert a signal corresponding to red (R) or blue (B) and a signal corresponding to green (G) included in the image data received from the processor 1110 into a red (R) or blue (B) data voltage and a green (G) data voltage, respectively, and alternately provide the red (R) or blue (B) data voltage and the green (G) data voltage to the plurality of pixel columns included in the display panel 1141 during one horizontal period.

In an embodiment, the processor 1110 may control the display module 1140 so that the red (R) or blue (B) data voltage is first provided to a first sub-data line corresponding to a first pixel column among the plurality of pixel columns during a first horizontal period, and then the green (G) data voltage is provided to a second sub-data line corresponding to a second pixel column. In an embodiment, the processor 1110 may control the display module 1140 so that the green (G) data voltage is first provided to the second sub-data line during a second horizontal period which is a next period of the first horizontal period, and then the red (R) or blue (B) data voltage is provided to the first sub-data line.

The power module 1150 supplies power to a component of the electronic device 1000. The power module 1150 may include a battery that charges a power voltage. The battery may include a non-rechargeable primary cell, and a rechargeable secondary cell or fuel cell. The power module 1150 may include a power management integrated circuit (PMIC). The PMIC supplies optimized power to each of the above-described module and a module to be described later. The power module 1150 may include a wireless power transmission/reception member electrically connected to the battery. The wireless power transmission/reception member may include a plurality of antenna radiators of a coil form.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input by a body of the user or an input by a pen among the first input module 1131, and may generate an electrical signal or a data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a fingerprint of the user. The fingerprint sensor 1161-1 may include any one of an optical type fingerprint sensor or a capacitive type fingerprint sensor.

The input sensor 1161-2 may generate a data value corresponding to coordinate information of the input by the body of the user or the pen. The input sensor 1161-2 generates a capacitance change amount by the input as the data value. The input sensor 1161-2 may sense an input by the passive pen or may transmit/receive data to and from the active pen.

The input sensor 1161-2 may measure a biometric signal such as, for example, blood pressure, water, or body fat. For example, when the user touches a sensor layer or a sensing panel with a body part and does not move during a certain time, the input sensor 1161-2 may sense the biometric signal based on a change of an electric field by the body part and output information desired by the user to the display module 1140.

The digitizer 1161-3 may generate a data value corresponding to coordinate information of the input by the pen. The digitizer 1161-3 generates an electromagnetic change amount by the input as the data value. The digitizer 1161-3 may sense the input by the passive pen or may transmit/receive data to and from the active pen.

At least one of the fingerprint sensor 1161-1, the input sensor 1161-2, and the digitizer 1161-3 may be implemented as the sensor layer formed on the display panel 1141 through a continuous process. The fingerprint sensor 1161-1, the input sensor 1161-2, and the digitizer 1161-3 may be disposed above the display panel 1141, and any one of the fingerprint sensor 1161-1, the input sensor 1161-2, and the digitizer 1161-3, for example, the digitizer 1161-3, may be disposed below the display panel 1141.

At least two of the fingerprint sensor 1161-1, the input sensor 1161-2, and the digitizer 1161-3 may be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and a window disposed above the display panel 1141. According to an embodiment, the sensing panel may be disposed on the window. A position of the sensing panel is not particularly limited.

At least one of the fingerprint sensor 1161-1, the input sensor 1161-2, and the digitizer 1161-3 may be embedded in the display panel 1141. That is, at least one of the fingerprint sensor 1161-1, the input sensor 1161-2, and the digitizer 1161-3 may be simultaneously formed through a process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to the outside of the electronic device 1000 or receiving a signal or power from the outside of the electronic device 1000. According to an embodiment, the communication module 1173 may transmit a signal to an external electronic device or receive a signal from an external electronic device through an antenna suitable for a communication method. An antenna pattern of the antenna module 1162 may be integrated into one configuration (for example, the display panel 1141) of the display module 1140 or the input sensor 1161-2.

The sound output module 1163 is a device for outputting a sound signal to the outside of the electronic device 1000, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 1163 may be integrated into the display module 1140.

The camera module 1171 may capture a still image and a moving image. According to an embodiment, the camera module 1171 may include, for example, one or more lenses, an image sensor, or an image signal processor. The camera module 1171 may further include, for example, an infrared camera capable of measuring presence or absence of the user, a position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as, for example, a cellular communication module, a short-range wireless communication module, or a global navigation satellite system (GNSS) communication module, and a wired communication module such as a local area network (LAN) communication module or a power line communication module. The communication module 1173 may communicate with the external electronic device 2000 through a short-range communication network such as, for example, BLUETOOTH, WIFI direct, or infrared data association (IrDA), or a long-range communication network such as, for example, a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 outputs a command or data to the display module 1140, the sound output module 1163, the camera module 1171, or the light module 1172 based on input data received from the input module 1130. For example, the processor 1110 may generate image data in response to the input data applied through a mouse, an active pen, or the like, and output the image data to the display module 1140, or generate command data in response to the input data and output the command data to the camera module 1171 or the light module 1172. When the input data is not received from the input module 1130 during a certain time, the processor 1110 may convert an operation mode of the electronic device 1000 to a low power mode or a sleep mode to reduce power consumed by the electronic device 1000.

The processor 1110 outputs a command or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to a comparison result. The processor 1110 may execute the command based on sensing data sensed by the input sensor 1161-2 or the digitizer 1161-3 or output corresponding image data to the display module 1140. When the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for, for example, the presence of the user, the position of the user, the gaze of the user, and the like, from the camera module 1171. The processor 1110 may further perform luminance correction or the like on the image data based on the measurement data. For example, the processor 1110 that determines the presence or absence of the user through an input from the camera module 1171 may output image data of which a luminance is corrected through the data conversion circuit 1112-2 or the gamma correction circuit 1112-3 to the display module 1140.

Some of the above-described components may be connected to each other through a communication method between peripheral devices, for example, a bus, general purpose input/output (GPIO) interface, a serial peripheral interface (SPI), a mobile industry processor interface (MIPI), or an ultra path interconnect (UPI) link to exchange a signal (for example, a command or data) with each other. The processor 1110 may communicate with the display module 1140 through a mutually agreed interface, for example, any one of the above-described communication methods, and is not limited to the above-described communication method.

The electronic device 1000 according to various embodiments may be various types of devices. The electronic device 1000 may include, for example, at least one of a portable communication device (for example, a smartphone), a computer device, a portable multimedia device, a portable medical device, a camera, a wearable device, and a home appliance device. The electronic device 1000 according to embodiments is not limited to the above-described devices.

While the present disclosure has been particularly shown and described with reference to embodiments thereof, it will be understood by those of ordinary skill in the art that various changes in form and detail may be made therein without departing from the spirit and scope of the present invention as defined by the following claims.

What is claimed is:

1. A source driver, comprising:

a digital-to-analog converter configured to convert a signal corresponding to a first color and a signal corresponding to a second color included in digital image data received from outside of the source driver into a first color data voltage and a second color data voltage, which are analog voltages, respectively;

an output buffer unit including a first output buffer configured to alternately output the first color data voltage and the second color data voltage during one horizontal period among a plurality of horizontal periods; and a controller configured to control the digital-to-analog converter and the first output buffer to alternately output the first color data voltage and the second color data voltage corresponding to each horizontal period among the plurality of horizontal periods for each horizontal period, wherein the controller controls the first output buffer such that the second color data voltage is output after the first color data voltage is first output during a first horizontal period among the plurality of horizontal periods, and the first color data voltage is output after the second color data voltage is first output during a second horizontal period among the plurality of horizontal periods, wherein the second horizontal period is subsequent to the first horizontal period.

2. The source driver according to claim 1, wherein the digital-analog converter converts a signal corresponding to a third color included in the digital image data into a third color data voltage, which is an analog voltage, the output buffer unit further includes a second output buffer configured to alternately output the third color data voltage and the second color data voltage during the one horizontal period, and the controller controls the digital-to-analog converter and the second output buffer to output the third color data voltage and the second color data voltage corresponding to each horizontal period for each horizontal period.

3. The source driver according to claim 2, wherein the controller controls the second output buffer such that the second color data voltage is output after the third color data voltage is first output from the second output buffer during the first horizontal period, and the third color data voltage is output after the second color data voltage is output during the second horizontal period.

4. The source driver according to claim 3, further comprising:

a demultiplexer configured to selectively transfer the first color data voltage and the second color data voltage output from the first output buffer through a first data line to a first sub-data line and a second sub-data line for each horizontal period, and selectively transfer the third color data voltage and the second color data voltage output from the second output buffer through a second data line to a third sub-data line and a fourth sub-data line for each horizontal period.

5. The source driver according to claim 4, wherein each of the first horizontal period and the second horizontal period includes a first sub-period and a second sub-period which is subsequent to the first sub-period, and the controller controls the demultiplexer to transfer the first color data voltage from the first output buffer to the first sub-data line during the first sub-period of the first horizontal period, transfer the second color data voltage from the first output buffer to the second sub-data line during the second sub-period of the first horizontal period, transfer the second color data voltage from the first output buffer to the second sub-data line during the first sub-period of the second horizontal period, and transfer the first color data voltage from the first output buffer to the first sub-data line during the second sub-period of the second horizontal period.

6. The source driver according to claim 5, wherein the controller controls the demultiplexer to transfer the third color data voltage from the second output buffer to the third sub-data line during the first sub-period of the first horizontal period, transfer the second color data voltage from the second output buffer to the fourth sub-data line during the second sub-period of the first horizontal period, transfer the second color data voltage from the second output buffer to the fourth sub-data line during the first sub-period of the second horizontal period, and transfer the third color data voltage from the second output buffer to the third sub-data line during the second sub-period of the second horizontal period.

7. The source driver according to claim 6, wherein the demultiplexer comprises:

a first select transistor connected between the first data line and the first sub-data line;

a second select transistor connected between the first data line and the second sub-data line;

a third select transistor connected between the second data line and the third sub-data line; and a fourth select transistor connected between the second sub-data line and the fourth sub-data line, wherein the controller controls the first select transistor and the third select transistor to be turned on during the first sub-period of the first horizontal period, controls the second select transistor and the fourth select transistor to be turned on during the second sub-period of the first horizontal period and the first sub-period of the second horizontal period, and controls the first select transistor and the third select transistor to be turned on during the second sub-period of the second horizontal period.

8. A display device, comprising:

a pixel unit including a plurality of pixel columns, each including a plurality of sub-pixels;

a source driver configured to alternately output a first color data voltage and a second color data voltage through a first data line during one horizontal period including a first sub-period and a second sub-period, wherein the second sub-period is subsequent to the first sub-period;

a demultiplexer configured to selectively transfer the first color data voltage and the second color data voltage output through the first data line to a first sub-data line corresponding to a first pixel column among the plurality of pixel columns and a second sub-data line corresponding to a second pixel column among the plurality of pixel columns for each horizontal period among a plurality of horizontal periods; and a timing controller configured to control the demultiplexer to connect the first data line and the first sub-data line during a first sub-period of a first horizontal period, connect the first data line and the second sub-data line during a second sub-period of the first horizontal period and a first sub-period of a second horizontal period, and connect the first data line and the first sub-data line during a second sub-period of the second horizontal period, wherein a state in which the first data line and the second sub-data line are connected to each other is maintained during the second sub-period of the first horizontal period and the first sub-period of the second horizontal period.

9. The display device according to claim 8, wherein the source driver alternately outputs a third color data voltage and the second color data voltage through a second data line during the one horizontal period, the demultiplexer selectively transfers the third color data voltage and the second color data voltage output through the second data line to a third sub-data line corresponding to a third pixel column among the plurality of pixel columns and a fourth sub-data line corresponding to a fourth pixel column among the plurality of pixel columns for each horizontal period, the timing controller controls the source driver and the demultiplexer to connect the second data line and the third sub-data line during the first sub-period of the first horizontal period, connect the second data line and the fourth sub-data line during the second sub-period of the first horizontal period and the first sub-period of the second horizontal period, and connect the second data line and the third sub-data line during the second sub-period of the second horizontal period, and a state in which the second data line and the fourth sub-data line are connected to each other is maintained during the second sub-period of the first horizontal period and the first sub-period of the second horizontal period.

10. The display device according to claim 9, wherein the source driver outputs the first color data voltage to the first data line in the first sub-period of the first horizontal period, successively outputs the second color data voltage to the first data line in each of the second sub-period of the first horizontal period and the first sub-period of the second horizontal period, outputs the first color data voltage in the second sub-period of the second horizontal period, outputs the third color data voltage to the second data line in the first sub-period of the first horizontal period, successively outputs the second color data voltage to the second data line in each of the second sub-period of the first horizontal period and the first sub-period of the second horizontal period, and outputs the third color data voltage in the second sub-period of the second horizontal period.

11. The display device according to claim 8, wherein the demultiplexer is included in the source driver.

12. The display device according to claim 10, wherein the source driver comprises an output buffer unit including a first output buffer that alternately outputs the first color data voltage and the second color data voltage, and a second output buffer that alternately outputs the third color data voltage and the second color data voltage, and wherein the timing controller controls the demultiplexer to transfer the first color data voltage from the first output buffer to the first sub-data line during the first sub-period of the first horizontal period, transfer the second color data voltage from the first output buffer to the second sub-data line during the second sub-period of the first horizontal period, transfer the second color data voltage from the first output buffer to the second sub-data line during the first sub-period of the second horizontal period, and transfer the first color data voltage from the first output buffer to the first sub-data line during the second sub-period of the second horizontal period.

13. The display device according to claim 12, wherein the timing controller controls the demultiplexer to transfer the third color data voltage from the second output buffer to the third sub-data line during the first sub-period of the first horizontal period, transfer the second color data voltage from the second output buffer to the fourth sub-data line during the second sub-period of the first horizontal period, transfer the second color data voltage from the second output buffer to the fourth sub-data line during the first sub-period of the second horizontal period, and transfer the third color data voltage from the second output buffer to the third sub-data line during the second sub-period of the second horizontal period.

14. The display device according to claim 9, wherein the first pixel column includes a plurality of sub-pixels in which a first color sub-pixel having a first color and a third color sub-pixel having a third color are alternately arranged one by one along a first direction parallel to a direction in which the first sub-data line extends, the second pixel column includes a plurality of sub-pixels in which a second color sub-pixel having a second color is successively arranged along the first direction, the third pixel column includes a plurality of sub-pixels in which the third color sub-pixel and the first color sub-pixel are alternately arranged one by one along the first direction, and the fourth pixel column includes a plurality of sub-pixels in which the second color sub-pixel is successively arranged along the first direction.

15. The display device according to claim 14, wherein each of the plurality of sub-pixels comprises:

a light emitting element that emits light in any one of the first color, the second color, and the third color; and a driving transistor connected between power and an anode electrode of the light emitting element and that controls a current amount flowing from the power to the light emitting element based on a magnitude of a data voltage provided from the source driver through a data line.

16. The display device according to claim 15, wherein the pixel unit further comprises:

a fifth pixel column including a plurality of sub-pixels in which the first color sub-pixel and the third color sub-pixel are alternately arranged one by one along the first direction, an anode electrode of a light emitting element included in each of the third color sub-pixels arranged in the first pixel column is connected to a driving transistor included in each of the third color sub-pixels included in the third pixel column, and an anode electrode of a light emitting element included in each of the first color sub-pixels arranged in the third pixel column is connected to a driving transistor included in each of the first color sub-pixels included in the fifth pixel column.

17. The display device according to claim 16, wherein in the first horizontal period, emission of a light emitting element of the first color sub-pixel included in the first pixel column is controlled according to the first color data voltage provided to the first sub-data line through the first data line during the first sub-period of the first horizontal period, and in the second horizontal period, emission of the light emitting element included in the third color sub-pixel included in the first pixel column is controlled according to the third color data voltage provided to the third sub-data line through the second data line during the second sub-period of the second horizontal period.

18. The display device according to claim 17, wherein the source driver alternately outputs the first color data voltage and the second color data voltage through a third data line during one horizontal period, and the first color data voltage output through the third data line is transferred to a fifth sub-data line corresponding to the fifth pixel column, in the first horizontal period, emission of a light emitting element of the third color sub-pixel included in the third pixel column is controlled according to the third color data voltage provided to the third sub-data line through the second data line during the first sub-period of the first horizontal period, and in the second horizontal period, emission of the light emitting element of the first color sub-pixel included in the third pixel column is controlled according to the first color data voltage provided to the fifth sub-data line through the third data line during the second sub-period of the second horizontal period.

19. The display device according to claim 16, wherein during the first horizontal period and the second horizontal period, only the first color data voltage is provided to the first sub-data line, only the second color data voltage is provided to the second sub-data line, only the third color data voltage is provided to the third sub-data line, only the second color data voltage is provided to the fourth sub-data line, and only the first color data voltage is provided to a fifth sub-data line connected to the fifth pixel column.

20. The display device according to claim 13, wherein the demultiplexer comprises:

a first select transistor connected between the first data line and the first sub-data line;

a second select transistor connected between the first data line and the second sub-data line;

a third select transistor connected between the second data line and the third sub-data line; and a fourth select transistor connected between the second data line and the fourth sub-data line, wherein the controller controls the first select transistor and the third select transistor to be turned on during the first sub-period of the first horizontal period, controls the second select transistor and the fourth select transistor to be turned on during the second sub-period of the first horizontal period and the first sub-period of the second horizontal period, and controls the first select transistor and the third select transistor to be turned on during the second sub-period of the second horizontal period.

21. A method of driving a display device including a plurality of pixel columns, each including a plurality of sub-pixels, the method comprising:

outputting a first color data voltage through a first data line in a first sub-period of a first horizontal period;

connecting a first sub-data line corresponding to a first pixel column among the plurality of pixel columns and the first data line during the first sub-period of the first horizontal period;

successively outputting a second color data voltage different from the first color data voltage through the first data line in each of a second sub-period of the first horizontal period and a first sub-period of a second horizontal period;

connecting a second sub-data line corresponding to a second pixel column among the plurality of pixel columns and the first data line during the second sub-period of the first horizontal period and the first sub-period of the second horizontal period;

outputting the first color data voltage through the first data line in the second sub-period of the second horizontal period; and connecting the first sub-data line and the first data line during the second sub-period of the second horizontal period, wherein a state in which the first data line and the second sub-data line are connected to each other is maintained during the second sub-period of the first horizontal period and the first sub-period of the second horizontal period.

22. The method according to claim 21, further comprising:

outputting a third color data voltage different from the first color data voltage and the second color data voltage through a second data line in the first sub-period of the first horizontal period;

connecting a third sub-data line corresponding to a third pixel column among the plurality of pixel columns and the second data line during the first sub-period of the first horizontal period;

successively outputting the second color data voltage through the second data line in each of the second sub-period of the first horizontal period and the first sub-period of the second horizontal period;

connecting a fourth sub-data line corresponding to a fourth pixel column among the plurality of pixel columns and the second data line during the second sub-period of the first horizontal period and the first sub-period of the second horizontal period;

outputting the third color data voltage through the second data line in the second sub-period of the second horizontal period; and connecting the fourth sub-data line and the second data line during the second sub-period of the second horizontal period, wherein a state in which the second data line and the fourth sub-data line are connected to each other is maintained during the second sub-period of the first horizontal period and the first sub-period of the second horizontal period.

23. The method according to claim 22, wherein the display device includes a first output buffer that alternately outputs the first color data voltage and the second color data voltage to the first data line, and a second output buffer that alternately outputs the third color data voltage and the second color data voltage to the second data line.

24. The method according to claim 22, wherein the first pixel column includes a plurality of sub-pixels in which a first color sub-pixel and a third color sub-pixel are alternately arranged one by one along a first direction parallel to a direction in which the first sub-data line extends, the second pixel column includes a plurality of sub-pixels in which a second color sub-pixel is sequentially arranged along the first direction, the third pixel column includes a plurality of sub-pixels in which the third color sub-pixel and the first color sub-pixel are alternately arranged one by one along the first direction, and the fourth pixel column includes a plurality of sub-pixels in which the second color sub-pixel is successively arranged along the first direction.

25. The method according to claim 24, wherein the plurality of pixel columns further include a fifth pixel column including a plurality of sub-pixels in which the first color sub-pixel and the third color sub-pixel are alternately arranged one by one along the first direction, each of the plurality of sub-pixels includes a light emitting element that emits light in any one of the first color, the second color, and the third color, and a driving transistor that controls a current amount that flows from power to the light emitting element based on a magnitude of a data voltage provided from a data line, an anode electrode of a light emitting element included in each of the third color sub-pixels arranged in the first pixel column is connected to a driving transistor included in each of the third color sub-pixels included in the third pixel column, and an anode electrode of a light emitting element included in each of the first color sub-pixels arranged in the third pixel column is connected to a driving transistor included in each of the first color sub-pixels included in the fifth pixel column.

26. The method according to claim 25, wherein in the first horizontal period, emission of a light emitting element of the first color sub-pixel included in the first pixel column is controlled according to the first color data voltage provided to the first sub-data line through the first data line during the first sub-period of the first horizontal period, and in the second horizontal period, emission of the light emitting element included in the third color sub-pixel included in the first pixel column is controlled according to the third color data voltage provided to the third sub-data line through the second data line during the second sub-period of the second horizontal period.

27. The method according to claim 26, further comprising:

outputting the first color data voltage through a third data line in the second sub-period of the second horizontal period; and connecting a fifth sub-data line corresponding to the fifth pixel column and the third data line during the second sub-period of the second horizontal period, wherein, in the first horizontal period, emission of a light emitting element of the third color sub-pixel included in the third pixel column is controlled according to the third color data voltage provided to the third sub-data line through the second data line during the first sub-period of the first horizontal period, and in the second horizontal period, emission of the light emitting element of the first color sub-pixel included in the third pixel column is controlled according to the first color data voltage provided to the fifth sub-data line through the third data line during the second sub-period of the second horizontal period.

28. The method according to claim 25, wherein during the first horizontal period and the second horizontal period, only the first color data voltage is provided to the first sub-data line, only the second color data voltage is provided to the second sub-data line, only the third color data voltage is provided to the third sub-data line, only the second color data voltage is provided to the fourth sub-data line, and only the first color data voltage is provided to a fifth sub-data line connected to the fifth pixel column.

29. An electronic device, comprising:

a processor; and a display module configured to display an image corresponding to image data received from the processor under control of the processor, wherein the display module comprises:

a display panel including a plurality of pixel columns, each including a plurality of sub-pixels; and a source driver configured to convert a signal corresponding to a first color and a signal corresponding to a second color included in the image data into a first color data voltage and a second color data voltage, respectively, and alternately provide the first color data voltage and the second color data voltage to the plurality of pixel columns included in the display panel during one horizontal period, wherein the processor controls the display module such that the second color data voltage is output to a second sub-data line corresponding to a second pixel column among the plurality of pixel columns after the first color data voltage is first output to a first sub-data line corresponding to a first pixel column among the plurality of pixel columns during a first horizontal period, and the first color data voltage is output to the first sub-data line after the second color data voltage is first output to the second sub-data line during a second horizontal period, which is subsequent to the first horizontal period.

* * * * *